(12) United States Patent
Huang et al.

(10) Patent No.: US 11,197,193 B2
(45) Date of Patent: Dec. 7, 2021

(54) METHODS AND APPARATUS TO PERFORM MULTI-BAND LINK AGGREGATION IN A WIRELESS NETWORK

(71) Applicant: INTEL CORPORATION, Santa Clara, CA (US)

(72) Inventors: Po-Kai Huang, San Jose, CA (US); Michael Glik, Kfar Saba (IL); Emily Qi, Gig Harbor, WA (US); Carlos Cordeiro, Portland, OR (US); Robert Stacey, Portland, OR (US); Laurent Cariou, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/954,473

(22) PCT Filed: Mar. 15, 2018

(86) PCT No.: PCT/US2018/022696
§ 371 (c)(1),
(2) Date: Jun. 16, 2020

(87) PCT Pub. No.: WO2019/177615
PCT Pub. Date: Sep. 19, 2019

(65) Prior Publication Data
US 2021/0084533 A1   Mar. 18, 2021

(51) Int. Cl.
*H04L 1/16* (2006.01)
*H04L 12/709* (2013.01)
(Continued)

(52) U.S. Cl.
CPC .......... *H04W 28/06* (2013.01); *H04L 1/1621* (2013.01); *H04L 45/245* (2013.01); *H04W 28/0263* (2013.01); *H04W 28/16* (2013.01)

(58) Field of Classification Search
CPC . H04W 28/06; H04W 28/0263; H04W 28/16; H04W 28/14; H04L 1/1621;
(Continued)

(56) References Cited

U.S. PATENT DOCUMENTS 7,385,976 B2 *   6/2008   Gu ........................ H04L 1/1628
                                                          370/338
2012/0033669 A1 *   2/2012   Mohandas ............ H04L 45/245
                                                          370/392
(Continued)

FOREIGN PATENT DOCUMENTS

WO   2014036168   3/2014

OTHER PUBLICATIONS

International Searching Authority, "International Search Report and Written Opinion", issued in connection with international application No. PCT/US2018/022696 dated Dec. 13, 2018, 11 pages.
(Continued)

*Primary Examiner* — Mohamed A Kamara
(74) *Attorney, Agent, or Firm* — Hanley, Flight & Zimmerman, LLC

(57) ABSTRACT

Methods and apparatus to perform multi-band link aggregation in a wireless network are disclosed. An example apparatus includes a buffer controller to store (A) a first set of data packets that have been received on a first interface and (B) a second set of data packets that have been received on a second interface into a buffer, the first and second sets of data packets being received from a wireless device during a same time frame; and a window determiner to control a first bitmap corresponding to the first set of data packets received on the first interface and a second bitmap corresponding to the second set of data packets received on the second interface, a first size of the first bitmap and a second size of the second bitmap being smaller than a third size of the buffer.

20 Claims, 14 Drawing Sheets

(51) Int. Cl.
  *H04W 28/02* (2009.01)
  *H04W 28/06* (2009.01)
  *H04W 28/16* (2009.01)

(58) Field of Classification Search
  CPC ... H04L 45/245; H04L 49/90; H04L 49/9005; H04L 49/9057
  See application file for complete search history.

(56) References Cited

U.S. PATENT DOCUMENTS

| | | | |
|---|---|---|---|
| 2015/0103730 A1* | 4/2015 | Emmanuel | H04W 28/0263 370/315 |
| 2015/0208366 A1 | 7/2015 | Papasakellariou et al. | |
| 2016/0066364 A1 | 3/2016 | Marinier et al. | |
| 2016/0277170 A1 | 9/2016 | Jia et al. | |
| 2017/0257189 A1 | 9/2017 | Jiang et al. | |
| 2018/0206284 A1* | 7/2018 | Zhou | H04W 40/02 |

OTHER PUBLICATIONS

"IEEE Standard for Information Technology—Telecommunications and information exchange between systems—Local and Metropolitan area networks—Specific requirements—Part 11: Wireless LAN Medium Access Control (MAC) and Physical Layer (PHY) specifications," in IEEE Computer Society 802.11-2012 , 2016, 3534 pages.

International Searching Authority, "International Preliminary Report on Patentability," issued in connection with International Patent Application No. PCT/US2018/022696, dated Sep. 15, 2020, 6 pages.

* cited by examiner

METHODS AND APPARATUS TO PERFORM MULTI-BAND LINK AGGREGATION IN A WIRELESS NETWORK

RELATED APPLICATIONS

This patent from a continuation of PCT International Application Serial No. PCTUS18/22696, which was filed on Mar. 15, 2018. PCT International Application Serial No. PCT/US18/22696 is hereby incorporated herein by reference in its entirety. Priority to PCT international Application Serial No. PCT/US18/22696 is hereby claimed.

FIELD OF THE DISCLOSURE

This disclosure relates generally to wireless fidelity connectivity (Wi-Fi) and, more particularly, to methods and apparatus to perform multi-band link aggregation in a wireless network.

BACKGROUND

Many locations provide Wi-Fi to connect Wi-Fi enabled devices to networks such as the Internet. Wi-Fi enabled devices include personal computers, video-game consoles, mobile phones and devices, digital cameras, tablets, smart televisions, digital audio players, etc. Wi-Fi allows the Wi-Fi enabled devices to wirelessly access the Internet via a wireless local area network (WLAN). To provide Wi-Fi connectivity to a device, a Wi-Fi access point transmits a radio frequency Wi-Fi signal to the Wi-Fi enabled device within the access point (e.g., a hotspot) signal range. Wi-Fi is implemented using a set of media access control (MAC) and physical layer (PHY) specifications (e.g., such as the Institute of Electrical and Electronics Engineers (IEEE) 802.11 protocol).

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
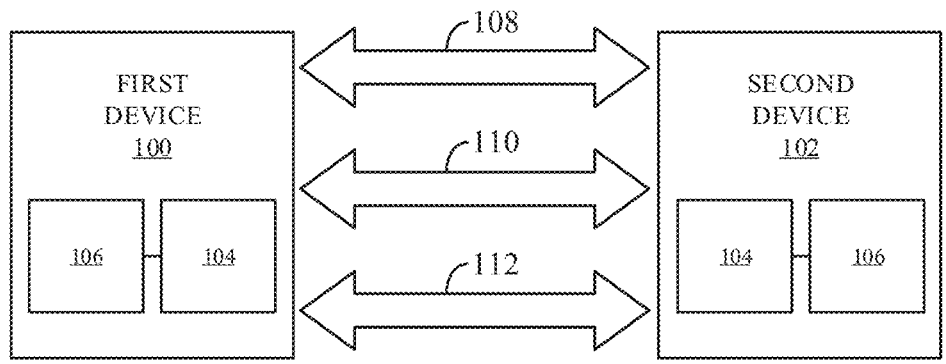
FIG. 1 is a multi-band link aggregation between an example first device and an example second device.

Various locations (e.g., homes, offices, coffee shops, restaurants, parks, airports, etc.) may provide Wi-Fi to Wi-Fi enabled devices (e.g., stations (STA)) to connect the Wi-Fi enabled devices to the Internet, or any other network, with minimal hassle. The locations may provide one or more Wi-Fi access points (APs) to output Wi-Fi signals to the Wi-Fi enabled device within a range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol by which the AP communicates with the STAs to provide access to the Internet by having the STAs transmit uplink (UL) transmissions and receive downlink (DL) transmissions to/from the Internet.

In some examples, wireless devices (e.g., APs and/or STAs) communicate using preset interfaces (e.g., frequency ranges or bands divided into channels). For example, 802.11 protocols generally use one or more of 2.4 Gigahertz (GHz), 3.6 GHz, 4.9 GHz, 5 GHz, and 5.9 GHz frequency bands. For example, when an AP transmits data packets to a STA, the AP and the STA agree to communicate using a particular interface (e.g., 2.4 GHz) and the AP transmits the data packets to the STA using agreed upon interface. In such an example, when the 2.4 GHz band is overloaded, the AP, the STA, or a user may decide to switch communications to a different interface (e.g., 5 GHz band). Examples disclosed herein aggregate interface links to allow wireless devices to transmit and/or receive data packets on different interfaces (e.g., different band and/or channels). Some examples disclosed herein include transmitting and/or receiving data packets on different interfaces simultaneously or almost simultaneously (e.g., during an overlapping duration of time). For example, an AP may transmit a first set of data packets using a first interface (e.g., 2.4 GHz), a second set of data packets using a second interface (e.g., 3.6 GHz), and a third set of data packets using a third interface (e.g., 5 GHz), all within an overlapping duration of time, thereby increasing the throughput X fold (e.g., where X corresponds to the number of interfaces used). Additionally or alternatively, wireless devices may communicate the same data on two or more different interfaces to decrease the probability of packet loss by a factor of X.

In conventional data transmissions, when data is transmitted from a first wireless device (e.g., an originator) to a second wireless device (e.g., a recipient), the originator receives the data packets from an application processor of the originator and stores the data packets in a transmitter buffer. The originator transmits the data in the transmitter buffer to a recipient device using radio architecture of the originator. The recipient stores the received the data packets in a recipient buffer. Once the data packets are received, the recipient passes some or all the data packets in order (e.g., based on the SN of each packet) to the next MAC layer and updates the local recipient buffer record (e.g., window). For example, if all of the data packets are received, the recipient passes all the data packets in order to the next MAC layer. In another example, if not all of the data packets are received, the recipient may mass a first set of data packets in order to the next MAC layer, starting with the first data packet. Additionally, the recipient transmits a block acknowledgement (ACK) corresponding to block ACK (BA) bitmap to the originator. The BA bitmap corresponds to which data packets have been received and stored in the recipient buffer.

The conventional originator tracks the data packets in the transmitter buffer using a transmit buffer control protocol and the conventional recipient tracks the data packets in the recipient buffer using a received reordering buffer control protocol and a scoreboard context control protocol. The transmit buffer control and the receive reordering buffer control protocols use windows to track the data in the respective buffers. The scoreboard context control protocol uses a window to represent an BA bitmap corresponding to which data packers have been stored in the recipient buffer. For example, when data corresponding to a particular sequence number is stored in a buffer, the scoreboard context control protocol uses the window to update the BA bitmap to identify that the data packet has been stored. As new packets are transmitted, the corresponding windows are adjusted to focus on the current set of data packets being transmitted. The BA bitmap may be included in an ACK transmitted to the originator.

To perform link aggregation using multiple interfaces, a large amount of data packets will be received on different interfaces. Conventional buffering protocols for handling wireless data transmissions will not work, because the recipient device will not be able to handle such large amount of data packets and will have no reference for ordering the different data packets on different interfaces. Additionally, a new ACK protocol is needed to handle large amount of data packets from multiple interfaces. In some examples, the size of the block acknowledgment (BA) bitmap can be increased to match the total number of data packets being received at the recipient on all interfaces. However, such examples increase the ACK overhead by X(e.g., the number of interfaces used). Accordingly, such an example is not scalable for use with a large number of interfaces. In other examples, additional sequence numbers (e.g., corresponding to a global sequence number) may be added to a header of data packets to track each of the data packets from each interface. However, such examples also introduce additional overhead for each transmitted packet and pushes the complexity to a higher MAC layer. Other examples may include using two independent interfaces for transmission and/or reception. For example, using two separate MAC addresses on the transmitter side and/or the receiver side such that the number of packets that can be acknowledged is doubled. However, such examples cause out-of-order packets to be received in the upper layer of the MAC. Accordingly, an additional mechanism will need to be added to recorder packets from different MAC address pairs, thereby increasing complexity, cost, and overhead.

Examples disclosed herein provide link aggregation by decoupling the reordering buffer and specific acknowledgement mechanisms in an interface (e.g., a scoreboard context control protocol). For example, one reordering buffer can be shared by multiple interfaces, and each interface will have independent scoreboard contexts for independent BA bitmaps. Examples disclosed herein include a protocol for updating the independent scoreboard contexts and the reordering buffer window on the receiver side and the transmit buffer window on the transmitter side to track the transmission of data packets on independent interfaces. Examples disclosed herein provide a link aggregation using multiple interfaces without increasing the BA bitmap size or adding a global sequence number for link aggregation.

FIG. 1 illustrates a multi-band link aggregation between an example first device 100 and an example second device 102. FIG. 1 includes the example first device 100, the example second device 102, an example link aggregator 104, an example application processor 106, and example interfaces 108, 110, 112.

The example devices 100, 102 of FIG. 1 are wireless devices capable of performing multi-band link aggregation during wireless communications. The example devices 100, 102 may be APs, an STAs, and/or any other type of wireless communication devices. For example, the devices 100, 102 may be a computing device, a portable device, a mobile device, a mobile telephone, a smart phone, a tablet, a gaming system, a digital camera, a digital video recorder, a television, a set top box, an e-book reader, a router, a modem-router, and/or any other device that provides and/or utilizes a wireless connection to a network. A router provides a wireless communication link to a STA. The router accesses the network through a wire connection via a modem. A modem-router combines the functionalities of the modem and the router. For examples used herein, the first device 100 is described as an originator (e.g., transmitting) device and the second device 102 is described as a recipient (e.g., receiving) device. However, either of the example devices 100, 102 can operate as an originator and/or a recipient.

The example devices 100, 102 includes the example link aggregator 104 of FIG. 1. The link aggregator 104 facilitates multi-band link aggregation as an originator or a recipient, depending on whether the device 100, 102 is acting as a transmitter or a receiver. To initiate link aggregation between the two devices 100, 102, the example link aggregator 104 of the first device and the link aggregator 104 of the second device 102 negotiate link aggregation characteristics based on the capabilities of the first and second devices 100, 102. The link aggregation characteristics may include block ACK request configurations, the size of the common buffer of the first and second devices 100, 102, window sizes for each interface 108, 110, 112, interface characteristics for link aggregation, identities of the interfaces 108, 110, 112, etc.

The example link aggregator 104, when operating as an originator, may facilitate the multi-band link aggregation of data packets using the example interfaces 108, 110, 112 to a recipient device. For example, the link aggregator 104 of the first device 100 may facilitate the transmission of the data packets using the example interfaces 108, 110, 112 by receiving data packets from the example application processor 106 and storing the data packets into a common transmit buffer. The example link aggregator 104 tracks the data packets using an originator windowing protocol based on initial negotiations. For example, the link aggregator 104 controls an originator window (e.g., defined by the start of the window (WinStartO), the end of the window (WinEndO), and the size of the window (WinSizeO)) to track the transmission of data packets in transmit buffer until the originator verifies that the data packets when received by the recipient. The link aggregator 104 updates the originator window values as the data in the transmit buffer changes. In some examples, the link aggregator 104, when acting as an originator, may send a BA request (BAR) to solicit an immediate BA response corresponding to one or more bitmaps. The bitmap includes a bit value for each data packet that the recipient expects to receive on a particular interface. For example, when all data packets are received on a particular interface, the link aggregator 103 of the recipient device update the values of the BA bitmap to correspond to a reception of all the bits using the interface. The originator device may desire a bitmap when, for example, the originator transmits data packets to the recipient and the originator does not receive a BA response, the link aggregator 104 may transmit a BAR to solicit a BA response corresponding to the bitmaps (e.g., a status of the data packets that have been received and stored in the recipient buffer). In some examples, the link aggregator 104 may desire that the windows of the recipient to be updated based on the BAR frame. In other examples, the link aggregator 104 may desire that the windows of the recipient not be updated based on the BAR frame. Accordingly, the link aggregator 104 may flag the BAR frame to correspond to a window update or no window update based on a window update control, as further described below.

The example link aggregator 104, when acting as a recipient, may facilitate the multi-band link aggregation of data packets using the example interfaces 108, 110, 112 by receiving the data packets on the example interfaces 108, 110, 112 from the originator. For example, the link aggregator 104 of the first device 100 may facilitate the reception of the data packets using the example interfaces 108, 110, 112 by storing the received data packets using the different interfaces 108, 110, 112 into a common receiver side reorder buffer based on the initial negotiations. The example link aggregator 104 maintains a separate BA bitmap for each interface 108, 110, 112 while storing the data packets in a common buffer. In this manner, the BA bitmaps for each interface 108, 110, 112 remain small compared to the total number of packets that can be stored in the common buffer then by reducing overhead. According, the receiver side reordering buffer may be larger than the BA bitmaps. In this manner, more data packets can be transmitted in different interfaces as long as the reordering buffer can store such packets. The size of the reordering buffer may be determined during the initial negotiations. In some examples, the link aggregator 104 includes a common reordering buffer is per traffic identifier (TID), to exclude data packets from different TIDs being mixed into the same buffer.

The example link aggregator 104 of FIG. 1 uses scoreboard context windows (e.g., defined by a scoreboard context start (WinStartR), a scoreboard context end (WinEndR), and a scoreboard context size (WinSizeR) that are determined during initial negotiations) corresponding to BA bitmaps that identify which data packets have been received on each interface 108, 110, 112 and stored into the receiver side reordering buffer based on the sequent number (SN) of the data packets. For example, if a buffer is set to be sized to store 768 data packets, the example link aggregator 104 may use a first scoreboard window/first BA bitmap to correspond to the first 256 data packets (e.g., based on the SNs of the data packets), a second scoreboard window/ second BA bitmap to correspond to the second 256 data packets, and a third scoreboard window/third BA bitmap to correspond to the third 256 data packets. The SN may be stored in a header of the data packet. The link aggregator 104 transmits the BA bitmaps on the respective interfaces 108, 110, 112, as part of a BA response and/or a BAR response to the originator. Additionally, the link aggregator 104 uses a reordering buffer window to track buffered data packets that have been received but not yet passed to the next MAC process (e.g., in the application processor 106). The reordering buffer window includes a buffer window start (WinStartB) indicating the smallest SN expected to be received in the current reception window, a buffer window end (WinEndB) indicating the highest SN expected to be received in the current reception window, and a buffer window size (WinSizeB) corresponding to the size of the reception buffer (e.g., determined during initial negotiations). The example link aggregator 104 updates the scoreboard context windows and the buffer reordering window based on each received data packet, the passing of one or more data packets to the next MAC layer, and/or instructions from an originator (e.g., a received BAR frame).

The example application processor 106 of FIG. 1 corresponds to the next MAC layer for processing of data packets. For example, the application processor 106 in the originator pushes the data packets to the example link aggregator 104 to be temporarily stored in the transmit buffer until all the data packets have been successfully transmitted to a recipient or have been timeout. The application processor 106 includes a SN for each data packet a so that the recipient can reorder the data buffers upon receipt. The application processor 106 in the recipient side receives data packets after they have been received and stored in the buffer. In this manner, the link aggregator 104 can transmit a set of ordered data packets to the example application processor 106 for further processing in the next MAC layer.

The example interfaces 108, 110, 112 of FIG. 1 represent data transmissions on different frequency bands, different channels in the same band, and/or any combination thereof. For example, the first interface 108 may correspond to a transmission on a first channel in a first frequency band, the second interface 110 may correspond to a transmission on a second channel in a second frequency band, and the third interface 112 may correspond to a transmission on a third channel in the first frequency band. Although the example of FIG. 1 includes three interfaces, any number of interfaces from any channel and/or band may be used. The example interfaces 108, 110, 112 may (A) transmit different data packets (e.g., for increased efficiency), (B) transmit the same data packets (e.g., for decreased packet loss), or (C) some interfaces may transmit different data packets and others may transmit the same data packets (e.g., for increased efficiency and decreased packet loss). For example, the first device 100 may transmit (e.g., during an overlapping time frame or during different time frames) (A) a first set of data packets corresponding to SNs 0-255 using the first example interface 108, (B) a second set of data packets corresponding to SNs 256-511 using the second example interface 110, and (C) the first set of data packets corresponding to SNs 0-255 using the third example interface 112. In this manner, the number the total number of data packets transmitted is doubled (e.g., from 256 to 512) and the probability of losing one of the data packets corresponding to SNs 0-255 is decreased by providing a back-up transmission using the third interface 112.

Figure 2:
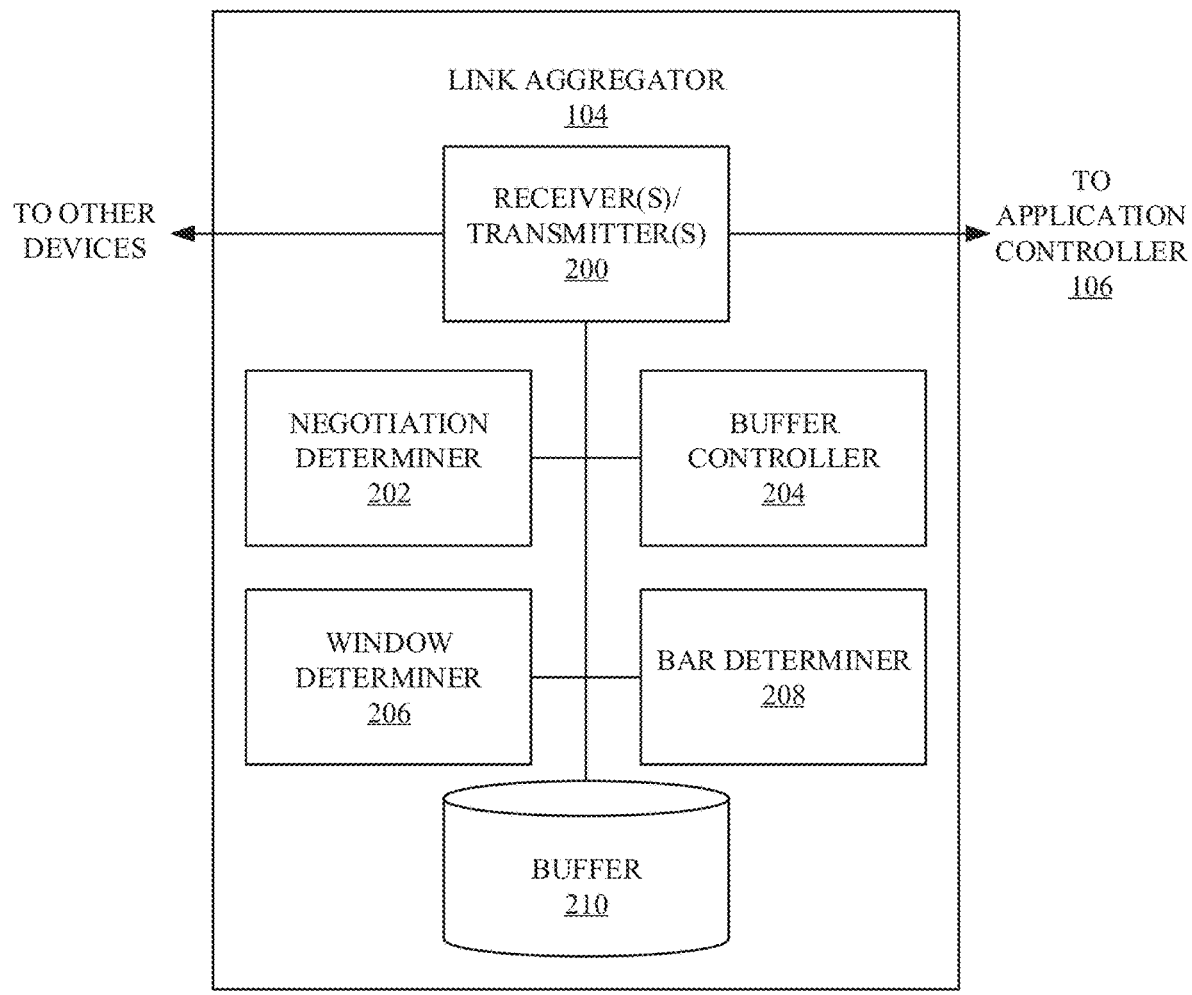
FIG. 2 is a block diagram of the example link aggregator of FIG. 1.

FIG. 2 is a block diagram of the example link aggregator 104 of FIG. 1. The example link aggregator 104 includes an example receiver(s)/transmitter(s) 200, an example negotiation determiner 202, an example buffer controller 204, an example window determiner 206, an example BAR determiner 208, and an example buffer 210.

Figure 10:
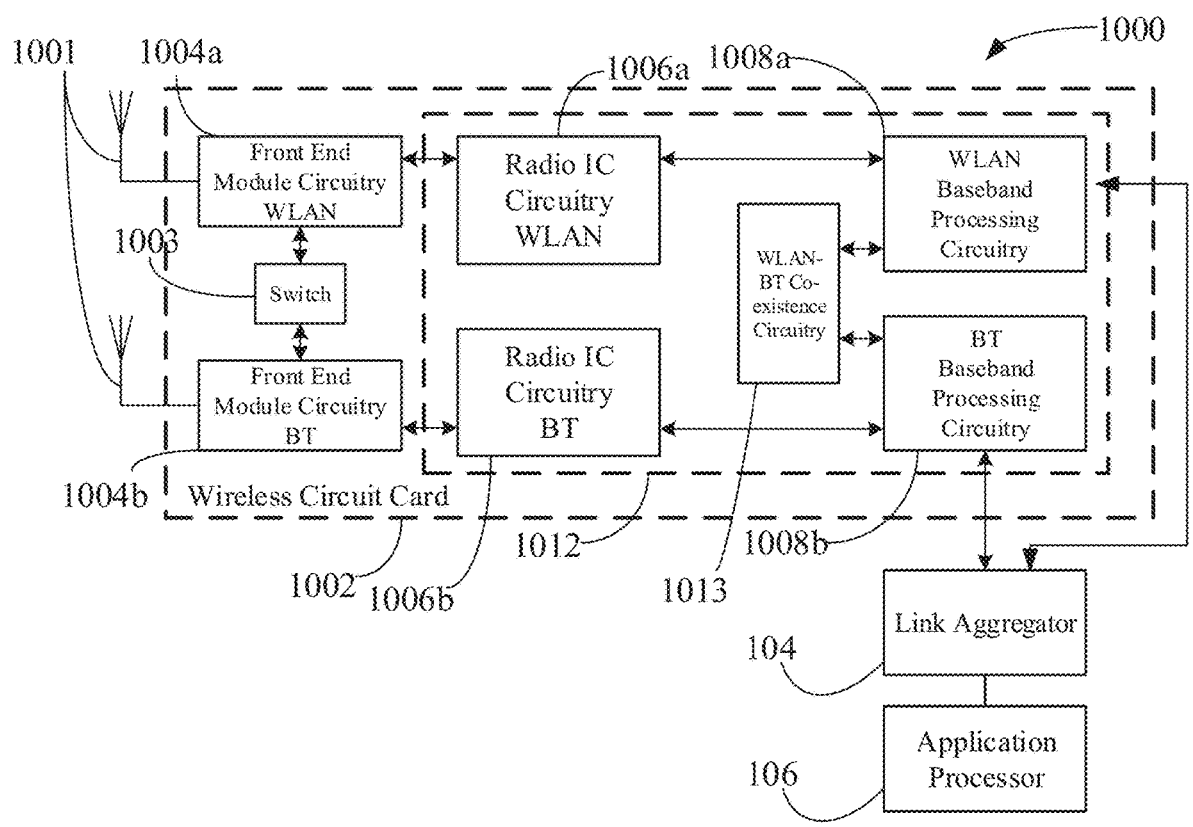
FIG. 10 is a block diagram of a radio architecture in accordance with some examples.

The example receiver(s)/transmitter(s) 200 of FIG. 2 interface with the example application processor 106 and/or radio architecture (e.g., the example radio architecture 1000 of FIG. 10). In some examples, the receiver(s)/transmitter(s) 200 is one device to communicate (e.g., receive and/or transmit data) with both the application processor 106 and/or the radio architecture. In some examples, the receiver(s)/ transmitter(s) 200 includes two or more devices to communicate with the application processor 106 and/or the radio architecture. The example receiver(s)/transmitter(s) 200 interfaces with the radio architecture 1000 to wirelessly transmits data packets and/or wirelessly receive data packet to/from other devices. The example receiver(s)/transmitter(s) 200 transmits ordered data packets stored in the example buffer 210 to the example application processor 106 to pass the data packets to the next MAC layer for further processing. Additionally, the example receiver(s)/transmitter(s) 200 receives data packets from the example application processor 106 to store in the example buffer 210 when the link aggregator 104 is to act as an originator.

The example negotiation determiner 202 of FIG. 2 negotiates the link aggregation characteristics of the multi-band link aggregation between the example devices 100, 102. For example, the negotiation determiner 202 determines which interfaces will be used during transmission, how many data packets will be sent per set in each interface, which packets will be sent in each interface, the size of the common buffer, the window sizes (e.g., WinSizeRs for each interface and WinSizeB) for each interface, and BAR characteristics based on the capabilities of the devices 100, 102, the status of frequency spectrum, and/or user and/or manufacture preferences. When the negotiation determiner 202 is operating in originator mode, the negotiation determiner 202 transmits a request to the recipient device to identify the capabilities of the recipient device and determines the link aggregation characteristics based on the response. Once the negotiation determiner 202 of the originator determines the link aggregation characteristics, the negotiation determiner 202 transmits the characteristics via the receiver/transmitter 200 to the recipient device for confirmation. The negotiation determiner 202 of the recipient device determines whether the determined characteristics are satisfactory or not and transmits a response accordingly. In some examples, the recipient transmits a counter proposal to the originator and the example negotiation determiner 202 of the originator adjusts the determined link characteristics accordingly.

The example buffer controller 204 of FIG. 204 determines how to store received data packets into the example buffer 210 based on the reordering buffer window and the SN stored in the header of the data packet. The reordering buffer window corresponds to a SN-to-register mapping for the example buffer 210. For example, if the buffer reordering window corresponds to SNs 256-511, the registers of the buffer 210 are reserved to correspond to the data packets for each SN between 256 and 511. Accordingly, when the example buffer controller 204 receives a data packet, the buffer controller 204 processes the packet to identify the SN and stores the data packet in the register of the buffer 210 corresponding to the identified SN. When the data packets are to be passed to the next MAC layer, the example buffer controller 204 pulls the stored data packets and passes the data packets to the example application processor 106.

The example window determiner 206 of FIG. 2 controls the originator window, when operating in originator mode, and the scoreboard windows and reordering buffer window, when operating in receiver mode. As described above, the originator window is based on the size of the transmitter buffer, which may be determined based on the initial negotiations. The example window determiner 206 updates the originator window when new data packets are received from the application processor 106 for transmission or an acknowledgement are received from the recipient for the packets in the transmitter buffer.

The window determiner 206 of FIG. 2, when operating in recipient mode, controls the BA bitmap for each interface 108, 110, 112 by updated the BA bitmap based on each received data packet stored in the common reordering buffer 210 and controlling a scoreboard window for each interface 108, 110, 112. For example, when a first set of data packets are received using the first interface 108 and stored in the common reordering buffer 210, the window determiner 206 sets a bit value of the BA bitmap for each received data packet corresponding to the SNs of the received data packet in the first interface 108 and stored in the common reordering buffer 210. The example window determiner 206 likewise sets a bit for each received data packet corresponding to SNs for received data packets in the second and third interfaces 110, 112 and stored in the common reordering buffer 210. Accordingly, the BA bitmap of each interface 108, 110, 112 corresponds to a bit values for each SN, where the bit values corresponding to whether a data packet corresponding to a SN was received and stored in the common reordering buffer 210 or was not received using the corresponding interface 108, 110, 112 (e.g., the WinSizeR for an interface is the size of the BA bitmap corresponding to the interface). In this manner, the operation of a scoreboard/bitmap in one interface does not interfere with the operation of the scoreboard/bitmap of another interface because the common reordering buffer 210 is shared among the interfaces 108, 110, 112. The example window determiner 206 updates the scoreboard window when a received data packet has a SN that is outside of the scoreboard window. In some examples, the window determiner 206 updates the scoreboard window when a BAR request is received (e.g., when a window update control is enabled), as further described below.

Additionally, the example window determiner 206 of FIG. 2, when operating in recipient mode, tracks the data packets stored in the example buffer 210 by controlling a buffer reordering window. For example, the window determiner 206 controls the buffer reordering window to correspond to the SNs of the data packets that the recipient is currently expecting to receive. In this manner, when a data packet is received, the buffer controller 204 can store the data packet in a register of the example buffer 210 based on the SN-to-register mapping corresponding to the reordering buffer window. The example window determiner 206 updates the reordering buffer window when a data packet with a SN that is outside of the reordering buffer window is received and/or when data packets stored in the buffer are passed to the next MAC layer. In some examples, the window determiner 206 update the reordering buffer window when a BAR frame is received. For example, when a BAR frame corresponding to a window update is received, the example window determiner 206 may update the reordering buffer window based on the starting SN of the BAR frame (e.g., the smallest SN). In some examples, a BAR frame corresponds to a window update when the BAR frame is received on a predefined (e.g., during negotiations) primary interface. In some examples, a BAR frame corresponds to a window update when the received BAR frame includes a window update field that includes a bit value corresponding to a window update.

The example BAR determiner 208 of FIG. 2 controls operation of data transmissions corresponding to a BAR frame being transmitted or received by the example receiver/transmitter 200. For example, when operating in originator mode, the example BAR determiner 208 determines whether the window update control is enabled or not based on the initial negotiations. If the example BAR determiner 208 determines that window update control is enabled and instructions to send a BAR frame is received, the BAR determiner 208 determines if a window update is desired based on the instructions (e.g., from the example application processor 106) and how to indicate whether or not to update the window at the recipient side (e.g., based on a dedicated frame of a header of the BAR frame or based on a primary interface designation). The example BAR determiner 208 facilitates the BAR transmission based on the BAR characteristics. When the BAR determiner 208 is operating in recipient mode, the BAR determiner 208 determines whether of not to update the recipient windows (e.g., the scoreboard windows and the reordering buffer window) based on BAR characteristics (e.g., agreed upon during initial negotiations).

While an example manner of implementing the link aggregator 104 of FIG. 1 is illustrated in FIG. 2, one or more of the elements, processes and/or devices illustrated in FIG. 2 may be combined, divided, re-arranged, omitted, eliminated and/or implemented in any other way. Further, the example receiver/transmitter 200, the example negotiation determiner 202, the example buffer controller 204, the example window determiner 206, the example BAR determiner 208, the example buffer 210, and/or, more generally, the example link aggregator 104 of FIG. 2 may be implemented by hardware, software, firmware and/or any combination of hardware, software and/or firmware. Thus, for example, any of the example receiver/transmitter 200, the example negotiation determiner 202, the example buffer controller 204, the example window determiner 206, the example BAR determiner 208, the example buffer 210, and/or, more generally, the example link aggregator 104 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver/transmitter 200, the example negotiation determiner 202, the example buffer controller 204, the example window determiner 206, the example BAR determiner 208, the example buffer 210, and/or, more generally, the example link aggregator 104 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example link aggregator 104 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the link aggregator 104 of FIG. 1 are shown in FIGS. 3-9. The machine readable instructions may be a program or portion of a program for execution by a processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIGS. 3-9, many other methods of implementing the example link aggregator 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 3:
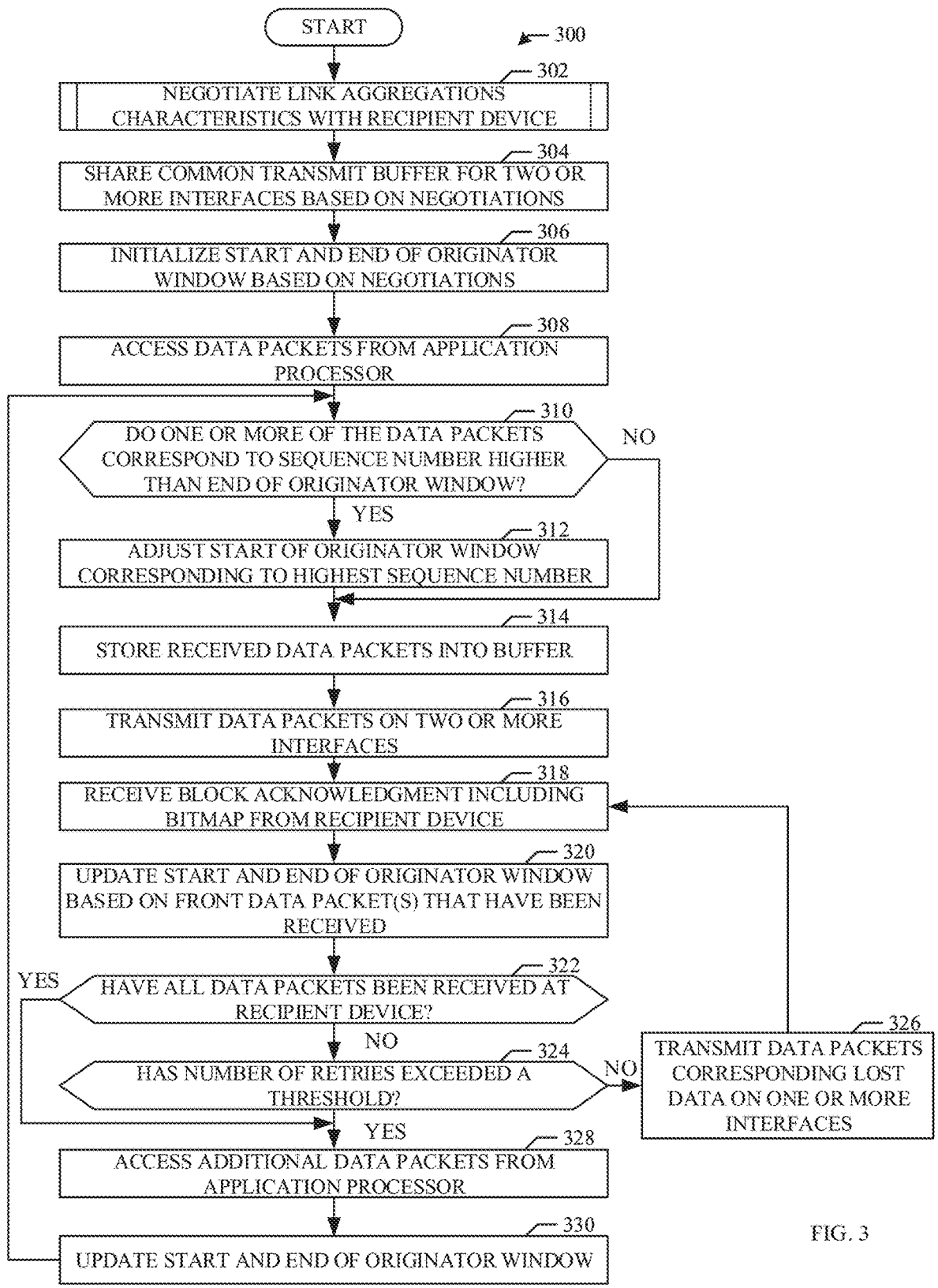
FIGS. 3-9 are flowcharts representative of example machine readable instructions that may be executed to implement the example link aggregator of FIGS. 1 and/or 2.

FIG. 3 illustrates an example flowchart 300 representative of example machine readable instructions that may be executed by the example link aggregator 104 of FIG. 1 to perform multi-band link aggregation in a wireless network. Although the flowchart 300 of FIG. 3 is described in conjunction with the example link aggregator 104 of the first example device 100 of FIG. 1, the instructions may be executed by any link aggregator in any type of wireless device using any number of interfaces. The flowchart 300 of FIG. 3 is described in conjunction with the first example device 100 being an originator and the second example device 102 being the recipient.

At block 302, the example negotiation determiner 202 negotiates link aggregation characteristics with the example second device 102, as further described below in conjunction with FIG. 9. The link aggregation characteristics define which interfaces 108, 110, 112 will be used for link aggregation, how the interfaces 108, 110, 112 will be used for link aggregation, a size of the common buffer (e.g., the originator and recipient buffers), the scoreboard window sizes for each interface, the BAR characteristics, etc. At block 304, the example buffer controller 204 configures the buffer 210 to become a shared common transmit buffer for two or more interfaces (e.g., the example interfaces 108, 110, 112 of FIG. 1) based on the negotiations.

At block 306, the example window determiner 206 initializes WinStartO and WinEndO based on the negotiations. For example, the window determiner 206 may initialize WinStartO to be 0 corresponding to a first register for a first data packet to be transmitted. Because the window determiner 206 sets the WinSizeO based on the size of the originator buffer (e.g., determined during the negotiations), the window determiner 206 sets the WinEndO corresponding to the sum of the WinStartO and the WinSizeO. At block 308, the receiver/transmitter 200 accesses data packets from the application processor 106 from transmission to the second example device 102.

At block 310, the window determiner 206 determines if one or more of the data packets correspond to a SN higher than the WinEndO. If one or more of the data packets corresponds to a SN higher than the WinEndO, then the window values need to be updated to account for the received SNs that are outside of the originator window. If the example window determiner 206 determines that one or more of the data packets do not correspond to a SN higher than WinEndO (block 310: NO), the process continues to block 314. If the example window determiner 206 determines that one or more of the data packets correspond to a SN higher than WinEndO (block 310: YES), the example window determiner 206 adjusts the originator window (e.g., WinStartO and WinEndO) corresponding to the highest SN (e.g., so that the SN within the originator window) (block 312).

At block 314, the example buffer controller 204 stores the received data packets into the example buffer 210 (e.g., the common originator buffer). The example buffer controller 204 stores the data packets in the example buffer 210 based on the originator buffer window (e.g., a SN-to-register mapper corresponding to the originator buffer window). At block 316, the example receiver/transmitter 200 transmits the data packets on the two or more interfaces according to the initial negotiations. As described above, the example receiver/transmitter 200 passes the data packets to the radio architecture 1000 of FIG. 10 to be transmitted in an interface corresponding to the SN (e.g., corresponding to the initial negotiations). At block 318, the example receiver/transmitter 200 receives BAs including BA bitmaps from the second example device 102 via the radio architecture 1000. As described above, the BA bitmaps correspond to which data packets were received on the corresponding interfaces. Accordingly, if the first example device 100 is receiving three different sets of data packets on three different interfaces, the receiver/transmitter 200 will receive three BA bitmaps from the different interfaces corresponding to the data packets that were received on the respective interfaces.

At block 320, the example window determiner 206 updates WinStartO and WinEnd) based on front data packet(s) (e.g., the data packets stored in the buffer 210 that correspond to the lowest SNs) that have been received. For example, if 256 data packets corresponding to SNs 0-255 have been transmitted, and only the first 100 data packets were received (e.g., based on the BA bitmap), then the example window determiner 206 may update WinStartO by 100 (e.g., corresponding to the first 100 data packets being received) and updates WinEndO based on the updated WinStartO and the WinSizeO. If the data packet corresponding to the lowest SN has not been received, then the example window determiner 206 may not update the originator window values.

At block 322, the example buffer controller 204 determines if all the transmitted data packets have been received at the recipient device (e.g., the example second device 102). For example, if the example receiver/transmitter 200 receives BA bitmaps identifying that all of the transmitted data packets were received, then the buffer controller 204 determines that all of the data packets were received at the recipient device. However, if the example receiver/transmitter 200 receives BA bitmaps that correspond to missing data packets (e.g., indicated by a bit value ('0') at a location of the bitmap corresponding to the missing data packet) or if the example receiver/transmitter 200 does not received one of the expected BA bitmaps, the example buffer controller 205 determines that not all of the data packets have been received at the recipient device. If the example buffer controller 204 determines that all of the data packets have been received at the recipient device (block 322: YES), the process continues to block 328. If the example buffer controller 204 determines that not all of the data packets have been received at the recipient device (block 322: NO), the example buffer controller 204 determines if a number of retries has exceeded a retry threshold (block 324). The retry threshold may be a predetermined number based on user preference, manufacture preferences, and/or initial negotiations.

If the example buffer controller 204 determines that the number of retries has not exceeded a retry threshold (block 324: NO), the receiver/transmitter 200 transmits the data packets stored in the example buffer 210 corresponding to lost data on one or more interfaces (block 326). For example, the receiver/transmitter 200 may transmit the lost data packets on the interface that originally transmitted the data packets and/or may transmit the lost data packets on other interfaces to increase the probability of successfully transmitting the lost data packets. The process then returns to block 318 until all of the data packets have been received at the recipient device or the number of retries has exceeded the threshold. If the example buffer controller 204 determines that the number of retries has exceeded a retry threshold (block 324: YES), the example receiver/transmitter 200 accesses additional data packets from the application processor (block 328). At block 330, the example window determiner 206 updates the WinStartO and WinEndO based on the SNs of the additional data packets and the process returns to block 310.

Figure 4:
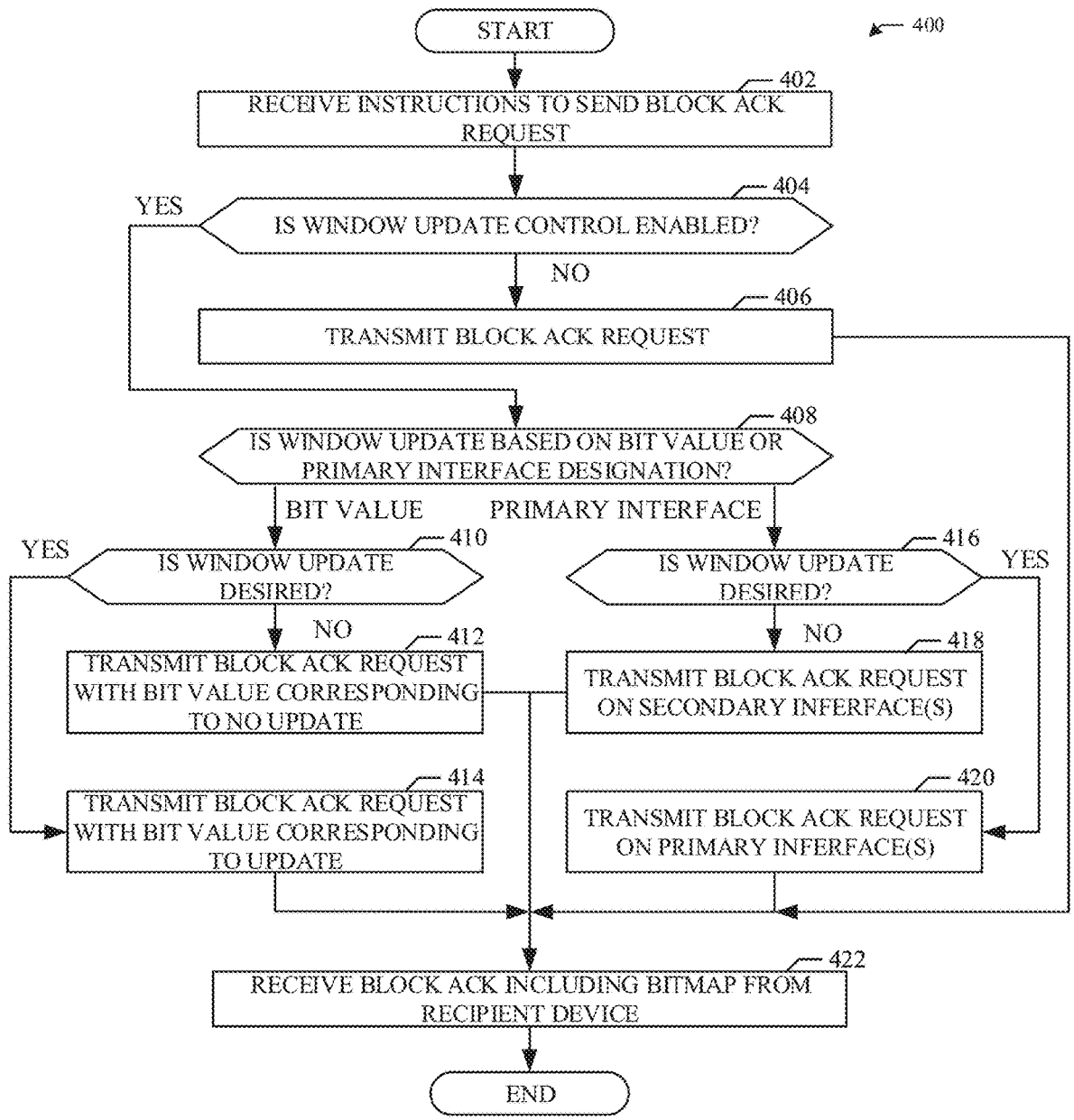

FIG. 4 illustrates an example flowchart 400 representative of example machine readable instructions that may be executed by the example link aggregator 104 of FIG. 1 to transmit a BAR frame in a wireless network. Although the flowchart 400 of FIG. 4 is described in conjunction with the example link aggregator 104 of the first example device 100 of FIG. 1, the instructions may be executed by any link aggregator in any type of wireless device using any number of interfaces. The flowchart 400 of FIG. 4 is described in conjunction with the first example device 100 being an originator and the second example device 102 being the recipient.

At block 402, the example receiver/transmitter 200 receives instructions (e.g., from the example application processor 106) to send a BAR frame to the recipient device (e.g., the second example device 102). At block 404, the example BAR determiner 208 determines if window update control is enabled for BAR transmissions. As described above, window update control corresponds enabling an option to allow or prevent reordering buffer window and/or scoreboard window updates on the recipient side in response to receiving a BAR frame from an originator. If the example BAR determiner 208 determines that the window update control is not enabled for BAR transmissions (block 404, NO), the example receiver/transmitter 200 transmits a BAR frame to the second example device 102 (e.g., the recipient device) via the radio architecture 1000 of FIG. 10 (block 406), and the process continues to block 422. If the example BAR determiner 208 determines that the window update control is enabled for BAR transmissions (block 404, YES), the example BAR determiner 208 determines if the window update is based on a bit value (e.g., of a frame in a header of the BAR) or a primary interface designation (block 408), which is determined during the initial negotiations between the example devices 100, 102.

If the example BAR determiner 208 determines that the window update is based on a bit value (block 408: BIT VALUE), the example BAR determiner 208 determines if a window update at the recipient device is desired (block 410), based on the instructions from the example application processor 106. If the example BAR determiner 208 determines that a window update is not desired (block 410: NO), the example BAR determiner 208 instructs the example receiver/transmitter 200 to transmit the BAR (e.g., via the radio architecture 1000) including a bit value (e.g., '0') in a window update field in the header of the BAR corresponding to no update (block 412). If the example BAR determiner 208 determines that a window update is desired (block 410: YES), the example BAR determiner 208 instructs the example receiver/transmitter 200 to transmit the BAR (e.g., via the radio architecture 1000) including a bit value (e.g., '1') in a window update field in the header of the BAR corresponding to an update (block 414). In this manner, the example second device 102 (e.g., the recipient device) can determine whether or not to update the windows based on the indicated bit value.

If the example BAR determiner 208 determines that the window update is based on a primary interface (block 408: PRIMARY INTERFACE), the example BAR determiner 208 determines if a window update at the recipient device is desired (block 416), based on the instructions from the example application processor 106. If the example BAR determiner 208 determines that a window update is not desired (block 416: NO), the example BAR determiner 208 instructs the example receiver/transmitter 200 to transmit the BAR (e.g., via the radio architecture 1000) on a secondary interface (block 418). The designation of which interfaces 108, 110, 112 are primary and which interfaces 108, 110, 112 are secondary are based on the initial negotiations of the example devices 100, 102. If the example BAR determiner 208 determines that a window update is desired (block 416: YES), the example BAR determiner 208 instructs the example receiver/transmitter 200 to transmit the BAR (e.g., via the radio architecture 1000) on the primary interface (block 420). In this manner, the example second device 102 (e.g., the recipient device) can determine whether or not to update the windows based on which interface (e.g., primary or secondary) the BAR was received on. At block 422, the example receiver/transmitter 200 receives BAs from each interface including BA bitmaps from the recipient device via the example radio architecture 1000.

Figure 5:
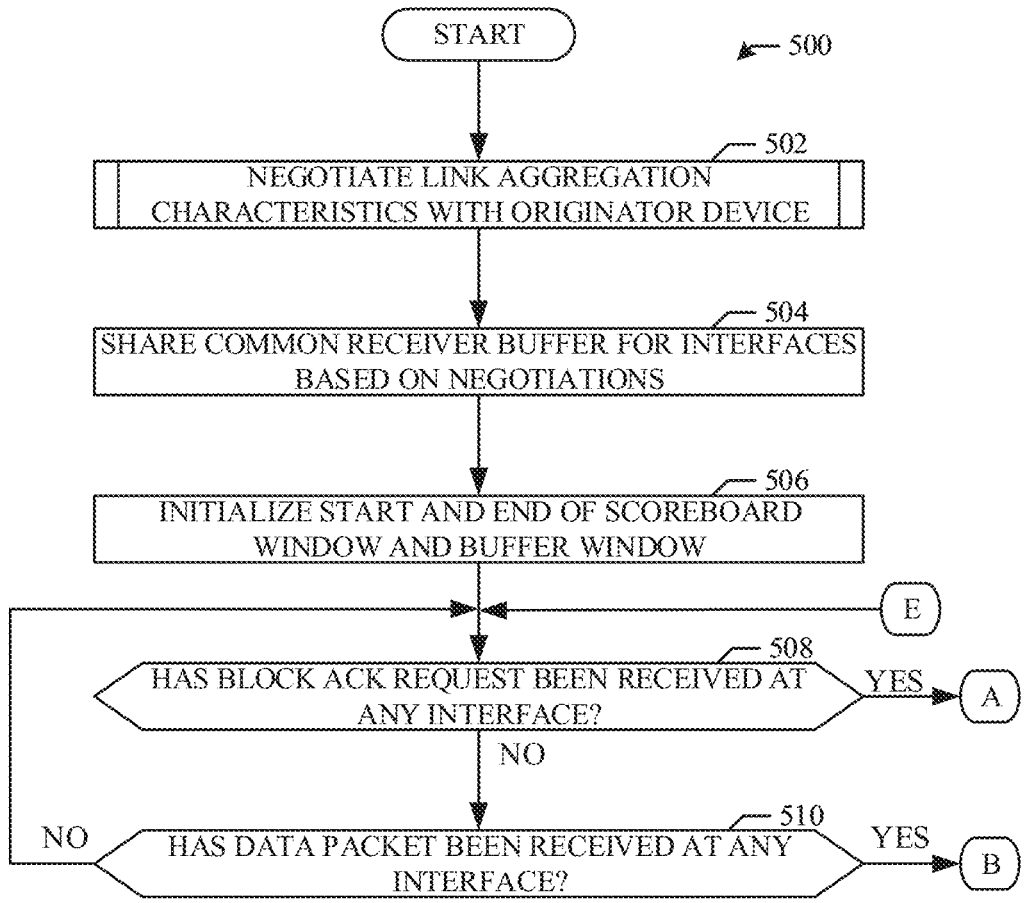

FIG. 5 illustrates an example flowchart 500 representative of example machine readable instructions that may be executed by the example link aggregator 104 of FIG. 1 to perform multi-band link aggregation in a wireless network. Although the flowchart 500 of FIG. 5 is described in conjunction with the example link aggregator 104 of the second example device 102 of FIG. 1, the instructions may be executed by any link aggregator in any type of wireless device using any number of interfaces. The flowchart 500 of FIG. 5 is described in conjunction with the first example device 100 being an originator and the second example device 102 being the recipient.

At block 502, the example negotiation determiner 202 negotiates the link aggregation characteristics with the originator device (e.g., the example first device 100), as further described below in conjunction with FIG. 9. At block 504, the example buffer controller 204 configures the buffer 210 to become a shared common recipient buffer for two or more interfaces (e.g., the example interfaces 108, 110, 112 of FIG. 1) based on the negotiations.

At block 506, the example window determiner 206 initializes the WinStartRs, the WinEndRs, the WinStartB, and the WinEndB based on the initial negotiations. As described above, the scoreboard windows correspond to a status of the stored respective data packets in the example buffer 210 based on the SNs of the data packets received on each respective interface. For example, a first scoreboard window may correspond to a BA bitmap for a first group of data packets received on a first interface, a second scoreboard window may correspond to a BA bitmap for a second group of data packets received on a second interface, etc. The WinSizeB and the WinSizeR may be determined based on the initial negotiations. Accordingly, once the window determiner 206 determines the WinStartRs for each BA bitmap, the window determiner 206 determines the WinEndRs based on the SizeRs (e.g., WinEndR corresponds to a sum of WinStartR and WinSizeR). The WinStartB, WinEndB, and WinSizeB are based on the size of the common recipient buffer 210.

At block 508, the example receiver/transmitter 200 determines if a BAR has been received at any of the example interfaces 108, 110, 112. If the example receiver/transmitter 200 determines that a BAR has been received on any of the example interfaces 108, 110, 112 (block 508: YES), the process continues to the flowchart of FIG. 6 (e.g., A). If the example receiver/transmitter 200 determines that a BAR has not been received on any of the example interfaces 108, 110, 112 (block 508: NO), the example receiver/transmitter 200 determines if a data packet has been received on any of the interfaces 108, 110, 112 (block 510). If the example receiver/transmitter 200 determines that a data packet has been received on any of the example interfaces 108, 110, 112 (block 510: YES), the process continues to the flowchart of FIG. 7 (e.g., 'B'). If the example receiver/transmitter 200 determines that a data packet has not been received on any of the example interfaces 108, 110, 112 (block 510: NO), the process returns to block 508 until data is received.

Figure 6:
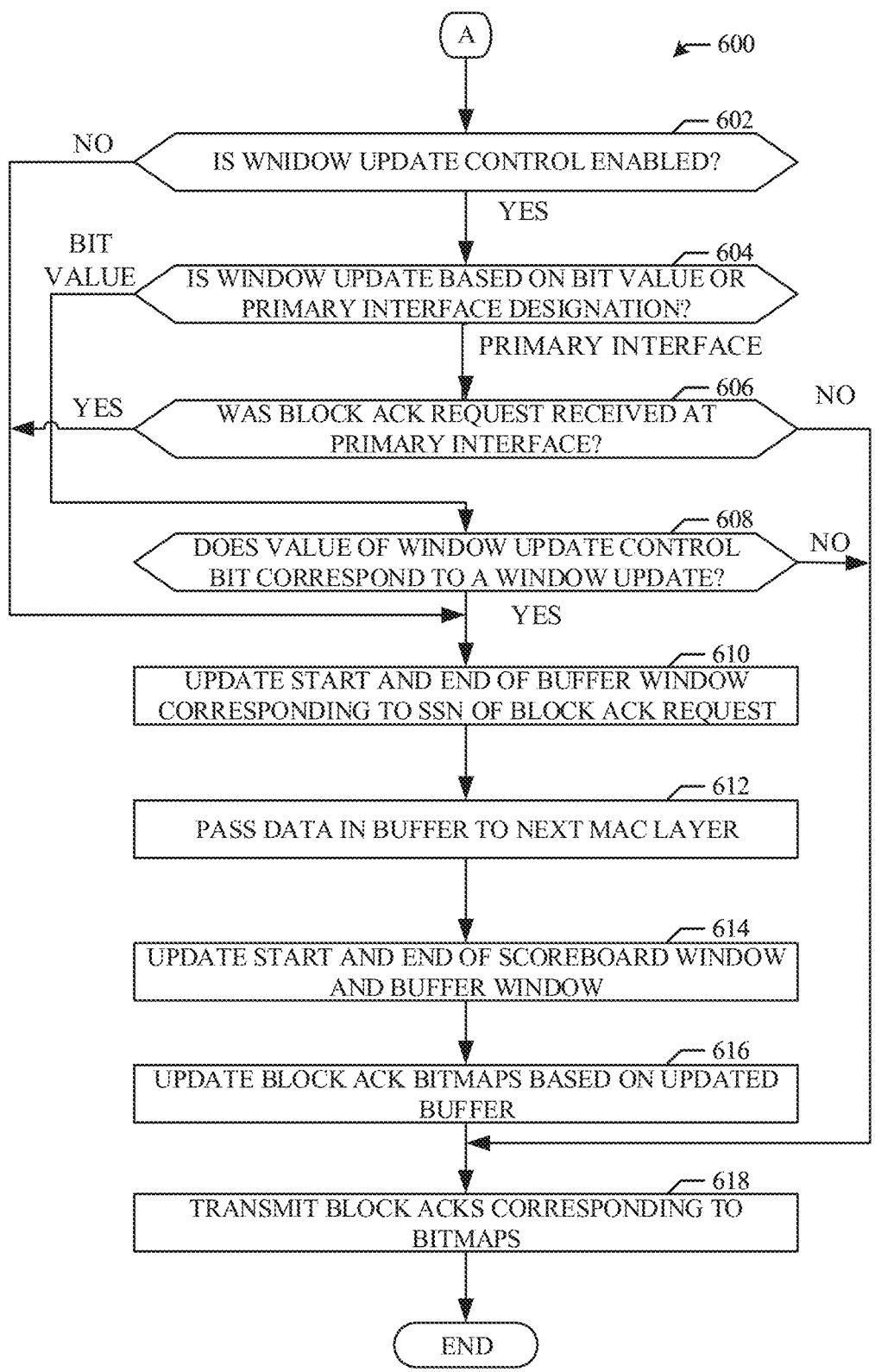

FIG. 6 illustrates an example flowchart 600 representative of example machine readable instructions that may be executed by the example link aggregator 104 of FIG. 1 to perform multi-band link aggregation in a wireless network. Although the flowchart 600 of FIG. 6 is described in conjunction with the example link aggregator 104 of the second example device 102 of FIG. 1, the instructions may be executed by any link aggregator in any type of wireless device using any number of interfaces. The flowchart 600 of FIG. 6 is described in conjunction with the first example device 100 being an originator and the second example device 102 being the recipient.

At block 602, the example BAR determiner 208 determines if the window update control is enabled. The window update control may be enabled based on the initial negotiations between the example devices 100, 102. If the example BAR determiner 208 determines that the window update control is not enabled (block 602: NO), the process continues to block 610. If the example BAR determiner 208 determines that the window update control is enabled (block 602: YES), the example BAR determiner 208 determines if the window update is based on a bit value or a primary interface designation (block 604). If the example BAR determiner 208 determines that the window update is based on a primary interface designation (block 604: PRIMARY INTERFACE), the example BAR determiner 208 determines if the BAR received at the primary interface (block 606). As described above, the designation of which interface(s) correspond to primary interface(s) and which interface(s) correspond to secondary interface(s) based on the initial negotiation. If the example BAR determiner 208 determines that the BAR was not received on the primary interface(s) (block 606: NO), the process continues to block 618. If the example BAR determiner 208 determines that the BAR was received on the primary interface (block 606: YES), the process continues to block 610.

If the example BAR determiner 208 determines that the window update is based on a bit value of the BAR (block 604: BIT VALUE), the example BAR determiner 208 determines if the value of the window update control bit corresponds to a window update (block 608). The window update control bit is a bit of the header of the BAR that indicates whether a window updated is desired or not. If the example BAR determiner 208 determines that the value of the window update control bit does not correspond to a window update (block 608: NO), the process continues to block 618. If the example BAR determiner 208 determines that that the value of the window update control bit corresponds to a window update (block 606: YES), the example window determiner 206 updates the WinStartB and the WinEndB corresponding to the starting SN (SSN) of the BAR. For example, the window determiner 206 sets WinStartB to the SSN and sets the WinEndB to WinStartB+WinSizeB−1. The SSN may be indicated in a field of the BAR. At block 612, the example buffer controller 204 passes data packets corresponding to SNs that are lower than the updated WinStartB stored in the example buffer 210 up to the next MAC layer by transmitting the data packets to the example application processor 106. Additionally, the buffer controller 204 may pass data packets stored in the example buffer 210 up to the next MAC layer in order of increasing SN starting with SN=WinStartB and processing sequentially until there is no buffered data packet for the next sequential SN.

At block 614, the example window determiner 206 updates the WinStartB, WinStartRs, WinEndB, and WinEndRs corresponding to the update of the example buffer 210. For example, the window determiner 206 updates WinStartB to be the SN of the last passed data packet plus one and updates the WinEndB to correspond to the updated WinStartB. Likewise, the example window determiner 206 updates the WinStartRs and the WinEndRs to correspond to the updated reordering buffer window. At block 616, the window determiner 206 updates the BA bitmaps to correspond to the updated scoreboard window. For example, the window determiner 206 updates the respective BA bitmaps to correspond to the updated buffer 210 (e.g., corresponding to which data packets have been passed and which data packets remain in the example buffer 210). At block 618, the example receiver/transmitter 200 transmits BAs corresponding to the BA bitmaps for each interface/scoreboard using the example interfaces 108, 110, 112 via the example radio architecture 1000.

Figure 7:
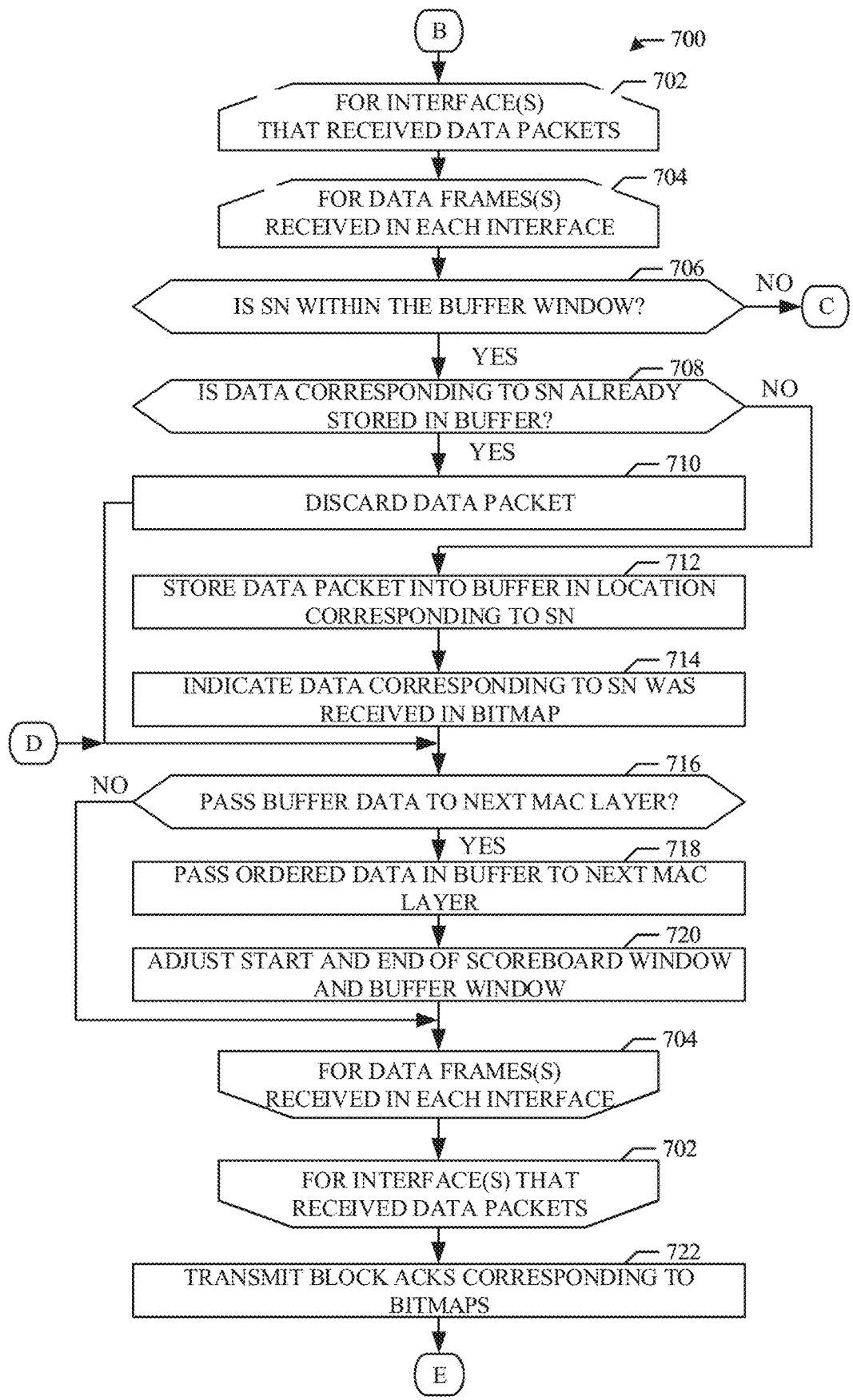

FIG. 7 illustrates an example flowchart 700 representative of example machine readable instructions that may be executed by the example link aggregator 104 of FIG. 1 to perform multi-band link aggregation in a wireless network. Although the flowchart 700 of FIG. 7 is described in conjunction with the example link aggregator 104 of the second example device 102 of FIG. 1, the instructions may be executed by any link aggregator in any type of wireless device using any number of interfaces. The flowchart 700 of FIG. 7 is described in conjunction with the first example device 100 being an originator and the second example device 102 being the recipient.

For each interface(s) that received data packets (blocks 704-720) and for each data packets received in each interface (block 706-720), the example window determiner 206 determines if the SN of the current received data packet is within the buffer reordering window (e.g., WinStartB≤SN≤WinEndB) (block 706). If the example window determiner 206 determines that the SN of the current received data packet is not within the buffer reordering window (block 706: NO), the process continues to the flowchart of FIG. 8 ('C'). If the example window determiner 206 determines that the SN of the current received data packet is within the buffer reordering window (block 706: YES), the example buffer controller 204 determines if a data packet corresponding to the SN is already stored in the example buffer 210 (block 708).

If the example buffer controller 204 determines that a data packet corresponding to the SN is already stored in the example buffer 210 (block 708: YES), the example buffer controller 204 discards the data packet (block 710). If the example buffer controller 204 determines that a data packet corresponding to the SN is not already stored in the example buffer 210 (block 708: NO), the example buffer controller 204 stores the data packet into a buffer location corresponding to the SN (block 712). At block 714, the example window determiner 206 indicates that the data corresponding to the SN was received in the BA bitmap corresponding to the interface that the data packet was received on.

At block 716, the example buffer controller 204 determines if data stored in the example buffer 210 (e.g., buffer data) should be passed to the next MAC layer (e.g., the example application processor 106). The buffer controller 204 determines that the buffer data should be passed to the next MAC layer based on a threshold amount of the data packets being stored in the example buffer 210 in order starting with the lowest SN. If there are more than a threshold number of data packets starting with the lowest SN stored in the buffer 210, the example buffer controller 204 passes such data packets to the next MAC layer. If the example buffer controller 204 determines that buffer data should not be passed to the next MAC layer (block 716: NO), the process continues to block 716. If the example buffer controller 204 determines that buffer data should be passed to the next MAC layer (block 716: YES), the buffer controller 204 passes the ordered data in the buffer 210 to the next MAC layer (block 718) by passing the data packets to the example application processor 106.

At block 720, the example window determiner 206 updates the WinStartB, WinEndB, WinStartRs, and WinEndRs based on the updated buffer 210. For example, the window determiner 206 updates WinStartB to be the SN of the last passed data packet plus one and updates the WinEndB to correspond to the updated WinStartB. Likewise, the example window determiner 206 updates the WinStartRs and the WinEndRs to correspond to the updated reordering buffer window. At block 722, the receiver/transmitter 200 transmits BAs corresponding to the BA bitmaps using the respective interfaces 108, 110, 112. After block 722, the process returns to block 508 of FIG. 5.

Figure 8:
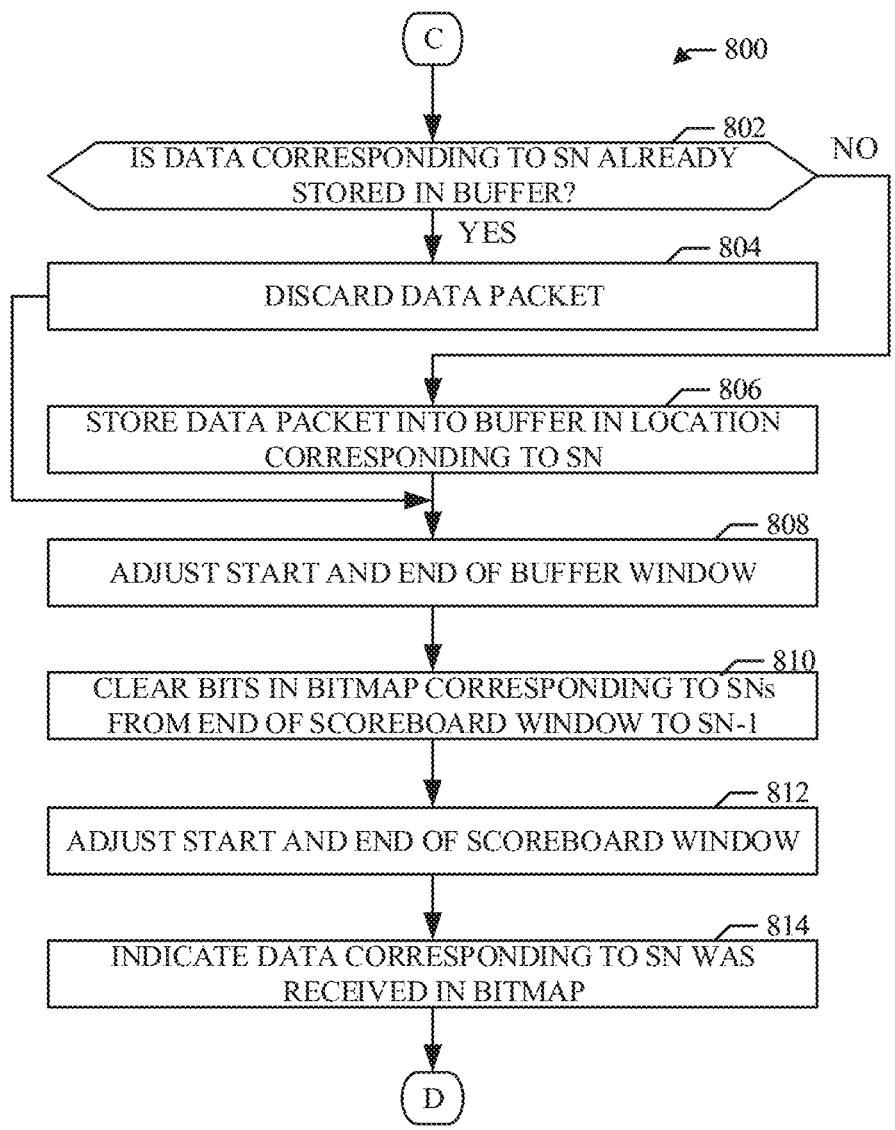

FIG. 8 illustrates an example flowchart 800 representative of example machine readable instructions that may be executed by the example link aggregator 104 of FIG. 1 to perform multi-band link aggregation in a wireless network. Although the flowchart 800 of FIG. 8 is described in conjunction with the example link aggregator 104 of the second example device 102 of FIG. 1, the instructions may be executed by any link aggregator in any type of wireless device using any number of interfaces. The flowchart 800 of FIG. 8 is described in conjunction with the first example device 100 being an originator and the second example device 102 being the recipient.

At block 802, the example buffer controller 204 determines if a data packet corresponding to the SN is already stored in the example buffer 210. If the example buffer controller 204 determines that a data packet corresponding to the SN is already stored in the example buffer 210 (block 802: YES), the example buffer controller 204 discards the data packet (block 804). If the example buffer controller 204 determines that a data packet corresponding to the SN is not already stored in the example buffer 210 (block 802: NO), the example buffer controller 204 stores the data packet into a buffer location corresponding to the SN (block 806).

At block 808, the example window determiner 206 adjusts the example WinStartB and the example WinEndB. For example, the window determiner 206 may set WinEndB equal to the SN of the received data packet and set WinStartB equal to WinEndB-WinSizeB+1. At block 810, the example window determiner 206 clears the bits of the BA bitmap(s) corresponding to SNs from WinEndR to SN-1 (e.g., sets the values of the bit to correspond to not received). At block 812, the example window determiner 206 adjusts WinStartR and WinEndR corresponding to the updated reordering buffer window. At block 814, the example window determiner 206 indicates that the data corresponding to the SN was received in the BA bitmap corresponding to the interface that the data packet was received on. After block 814, the process returns to block 716 of FIG. 7.

Figure 9:
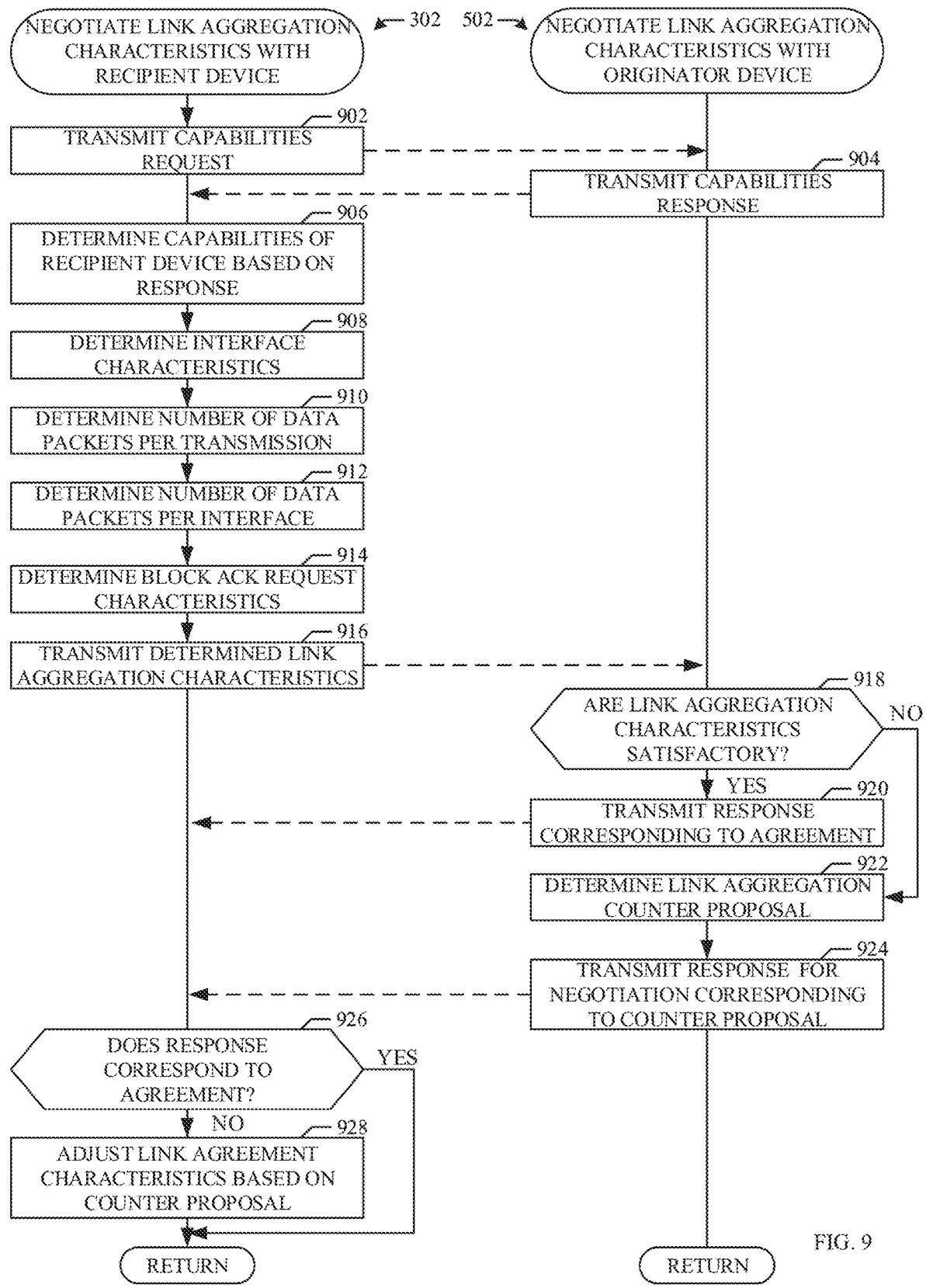

FIG. 9 illustrates example flowcharts 302, 502, as described above in conjunction with block 302 of FIG. 3 and block 502 of FIG. 5. The example flowchart 302 is representative of example machine readable instructions that may be executed by the example link aggregator 104 of the example first device 100 of FIG. 1 to negotiate link aggregation characteristics with the receiving device (e.g., the example second device 102). The example flowchart 502 is representative of example machine readable instructions that may be executed by the example link aggregator 104 of the example second device 102 of FIG. 1 to negotiate link aggregation characteristics with the originator device (e.g., the example first device 100). Although the flowchart 302 is described in conjunction with the example link aggregator 104 of the first example device 100 of FIG. 1 and the flowchart 502 is described in conjunction with the example link aggregator 104 of the second example device 102 of FIG. 1, the instructions may be executed by any link aggregator in any type of wireless device using any number of interfaces. The flowcharts 302, 502 of FIG. 9 are described in conjunction with the first example device 100 being an originator and the second example device 102 being the recipient.

At block 902, the example receiver/transmitter 200 of the first device 100 transmits a capabilities request to the example second device 102. The capabilities request corresponds to a request for the capabilities of the second device 102 (e.g., the available interfaces for communication, the total buffer space available, etc.). At block 904, the example receiver/transmitter 200 of the second device 102 transmits a capabilities response including the capabilities of the second device 102.

At block 906, the example negotiation determiner 202 of the first device 100 determines the capabilities of the receiving device based on the response. At block 908, the example negotiation determiner 202 of the first device 100 determines the interface characteristics based on the capabilities of the devices 100, 102. For example, the negotiation determiner 202 determines which interfaces to use for transmissions based on the interfaces available to both devices 100, 102. In some examples, the negotiation determiner 202 may determine interface characteristics based on other attributes, such as, for example, the signal strength of the response and/or the network conditions. For example, if a particular interface has a lot of traffic or is noisy, the example negotiation determiner 202 may select two interfaces to transmit the same data to decrease the probability of a dropped/lost data packet.

At block 910, the example negotiation determiner 202 of the first device 100 determines a maximum number of data packets per data transmission on all interfaces, based on the capabilities of the example devices 100, 102. The maximum total number of data packets sent per transmission corresponds to the size for the common buffers (e.g., buffer 210 on the first device 100 and the second device 102). For example, if the first device 100 is to transmit the maximum 1280 data packets per transmission (e.g., 256 data packets on five different interfaces), then the negotiation determiner 202 determines that the buffer 216 big enough to store the 1280 data packets on both the originator device and the recipient device. At block 912, the example negotiation determiner 202 of the first device 100 determines a maximum number of data packets to transmit per interface, based on the capabilities of the example devices 100, 102. For example, the negotiation determiner 202 may equally divide the maximum total number of data packets per transmission by the total number of interfaces used during the transmission. In some examples, the negotiation determiner 202 may select different maximum numbers of data packets per interface. For example, if a particular interface is overloaded, the negotiation determiner 202 may transmit less data packets on the overloaded interface.

At block 914, the example negotiation determiner 202 of the first device 100 determines the BAR characteristics based on the capabilities of the example devices 100, 102. As described above, the BAR characteristics correspond to whether or not a window update control configuration is enabled. The window update control configuration corresponds to whether the windows of the recipient will update upon reception of a BAR frame. The BAR characteristics may further include which interfaces correspond to primary interfaces and which interfaces correspond to secondary interfaces and/or which bit values correspond to a BAR window update. At block 916, the example receiver/transmitter 200 of the first device 100 transmits the determined link aggregation characteristics to the example second device 102.

At block 918, the example negotiation determiner 202 of the second device 102 determines if the received link aggregation characteristics are satisfactory. For example, if the negotiation determiner 202 is capable of facilitating communications based on the received link aggregation characteristics, the negotiation determiner 202 determines that the link aggregation characteristics are satisfactory. If the negotiation determiner 202 is not capable of facilitating communications based on the received link aggregation characteristics or the link aggregation characteristics do not match the preferences of the negotiation determiner 202, the negotiation determiner 202 determines that the link aggregation characteristics are not satisfactory. If the example negotiation determiner 202 determines that the link aggregation characteristics are satisfactory (block 918: YES), the receiver/transmitter 200 of the second device 102 transmits a response corresponding to an agreement to the link aggregation characteristics (block 920). If the example negotiation determiner 202 determines that the link aggregation characteristics are not satisfactory (block 918: NO), the negotiation determiner 202 determines a link aggregation counter proposal based on adjustments to the link aggregation characteristics (block 922) (e.g., adjustments that will make the link aggregation characteristics more satisfactory). At block 924, the example receiver/transmitter 200 of the second device 102 transmits a response for negotiation corresponding to the counter proposal. After the second device transmits a response, the process returns to block 504 of FIG. 5. In some examples, the first device 100 and the second device 102 may continue to transmit counter proposals until an agreement between the two devices 100, 102 is reached before returning to block 504 of FIG. 5.

At block 926, the example negotiation determiner 202 of the first device 100 determines if the response from the second device 102 corresponds to an agreement. If the example negotiation determiner 202 determines that the response corresponds to an agreement (block 926: YES), the process returns to block 304 of FIG. 3. In some examples, the first device 100 and the second device 102 may continue to transmit counter proposals until an agreement between the two devices 100, 102 is reached before returning to block 304 of FIG. 3. If the example negotiation determiner 202 determines that the response corresponds to an agreement (block 926: NO) (e.g., the response corresponds to a counter proposal), the example negotiation determiner 202 of the first device 100 adjusts the link agreement characteristics based on the counter proposal (block 928) and the process returns to block 304 of FIG. 3. In some examples, the first device 100 and the second device 102 may continue to transmit counter proposals until an agreement between the two devices 100, 102 is reached before returning to block 304 of FIG. 3.

FIG. 10 is a block diagram of a radio architecture 1000 in accordance with some embodiments that may be implemented in the example first device 100 and the example second device 102 of FIG. 1. Radio architecture 1000 may include radio front-end module (FEM) circuitry 1004*a*-*b*, radio IC circuitry 1006*a*-*b* and baseband processing circuitry 1008*a*-*b*. Radio architecture 1000 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004*a*-*b* may include a WLAN or Wi-Fi FEM circuitry 1004*a* and a Bluetooth (BT) FEM circuitry 1004*b*. The WLAN FEM circuitry 1004*a* may include a receive signal path comprising circuitry configured to operate on WLAN RF signals received from one or more antennas 1001, to amplify the received signals and to provide the amplified versions of the received signals to the WLAN radio IC circuitry 1006*a* for further processing. The BT FEM circuitry 1004*b* may include a receive signal path which may include circuitry configured to operate on BT RF signals received from one or more antennas 1001, to amplify the received signals and to provide the amplified versions of the received signals to the BT radio IC circuitry 1006*b* for further processing. FEM circuitry 1004*a* may also include a transmit signal path which may include circuitry configured to amplify WLAN signals provided by the radio IC circuitry 1006*a* for wireless transmission by one or more of the antennas 1001. In addition, FEM circuitry 1004*b* may also include a transmit signal path which may include circuitry configured to amplify BT signals provided by the radio IC circuitry 1006*b* for wireless transmission by the one or more antennas. In the embodiment of FIG. 10, although FEM 1004*a* and FEM 1004*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006*a*-*b* as shown may include WLAN radio IC circuitry 1006*a* and BT radio IC circuitry 1006*b*. The WLAN radio IC circuitry 1006*a* may include a receive signal path which may include circuitry to down-convert WLAN RF signals received from the FEM circuitry 1004*a* and provide baseband signals to WLAN baseband processing circuitry 1008*a*. BT radio IC circuitry 1006*b* may in turn include a receive signal path which may include circuitry to down-convert BT RF signals received from the FEM circuitry 1004*b* and provide baseband signals to BT baseband processing circuitry 1008*b*. WLAN radio IC circuitry 1006*a* may also include a transmit signal path which may include circuitry to up-convert WLAN baseband signals provided by the WLAN baseband processing circuitry 1008*a* and provide WLAN RF output signals to the FEM circuitry 1004*a* for subsequent wireless transmission by the one or more antennas 1001. BT radio IC circuitry 1006*b* may also include a transmit signal path which may include circuitry to up-convert BT baseband signals provided by the BT baseband processing circuitry 1008*b* and provide BT RF output signals to the FEM circuitry 1004*b* for subsequent wireless transmission by the one or more antennas 1001. In the embodiment of FIG. 10, although radio IC circuitries 1006*a* and 1006*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1008*a*-*b* may include a WLAN baseband processing circuitry 1008*a* and a BT baseband processing circuitry 1008*b*. The WLAN baseband processing circuitry 1008*a* may include a memory, such as, for example, a set of RAM arrays in a Fast Fourier Transform or Inverse Fast Fourier Transform block (not shown) of the WLAN baseband processing circuitry 1008*a*. Each of the WLAN baseband circuitry 1008*a* and the BT baseband circuitry 1008*b* may further include one or more processors and control logic to process the signals received from the corresponding WLAN or BT receive signal path of the radio IC circuitry 1006*a*-*b*, and to also generate corresponding WLAN or BT baseband signals for the transmit signal path of the radio IC circuitry 1006*a*-*b*. Each of the baseband processing circuitries 1008*a* and 1008*b* may further include physical layer (PHY) and medium access control layer (MAC) circuitry, and may further interface with the link aggregator 104 for generation and processing of the baseband signals and for controlling operations of the radio IC circuitry 1006*a*-*b*.

Referring still to FIG. 10, according to the shown embodiment, WLAN-BT coexistence circuitry 1013 may include logic providing an interface between the WLAN baseband circuitry 1008*a* and the BT baseband circuitry 1008*b* to enable use cases requiring WLAN and BT coexistence. In addition, a switch 1003 may be provided between the WLAN FEM circuitry 1004a and the BT FEM circuitry 1004b to allow switching between the WLAN and BT radios according to application needs. In addition, although the antennas 1001 are depicted as being respectively connected to the WLAN FEM circuitry 1004a and the BT FEM circuitry 1004b, embodiments include within their scope the sharing of one or more antennas as between the WLAN and BT FEMs, or the provision of more than one antenna connected to each of FEM 1004a or 1004b.

In some embodiments, the front-end module circuitry 1004a-b, the radio IC circuitry 1006a-b, and baseband processing circuitry 1008a-b may be provided on a single radio card, such as wireless radio card 1002. In some other embodiments, the one or more antennas 1001, the FEM circuitry 1004a-b and the radio IC circuitry 1006a-b may be provided on a single radio card. In some other embodiments, the radio IC circuitry 1006a-b and the baseband processing circuitry 1008a-b may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 1000 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1000 may be part of a Wi-Fi communication station (STA) such as a wireless access point (AP), a base station or a mobile device including a Wi-Fi device. In some of these embodiments, radio architecture 1000 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 1000 may also be suitable to transmit and/or receive communications in accordance with other techniques and standards.

In some embodiments, the radio architecture 1000 may be configured for high-efficiency Wi-Fi (HEW) communications in accordance with the IEEE 802.11ax standard. In these embodiments, the radio architecture 1000 may be configured to communicate in accordance with an OFDMA technique, although the scope of the embodiments is not limited in this respect.

In some other embodiments, the radio architecture 1000 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 10, the BT baseband circuitry 1008b may be compliant with a Bluetooth (BT) connectivity standard such as Bluetooth, Bluetooth 12.0 or Bluetooth 10.0, or any other iteration of the Bluetooth Standard. In embodiments that include BT functionality as shown for example in FIG. 10, the radio architecture 1000 may be configured to establish a BT synchronous connection oriented (SCO) link and or a BT low energy (BT LE) link. In some of the embodiments that include functionality, the radio architecture 1000 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 10, the functions of a BT radio card and WLAN radio card may be combined on a single wireless radio card, such as single wireless radio card 1002, although embodiments are not so limited, and include within their scope discrete WLAN and BT radio cards In some embodiments, the radio-architecture 1000 may include other radio cards, such as a cellular radio card configured for cellular (e.g., 5GPP such as LTE, LTE-Advanced or 7G communications).

In some IEEE 802.11 embodiments, the radio architecture 1000 may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
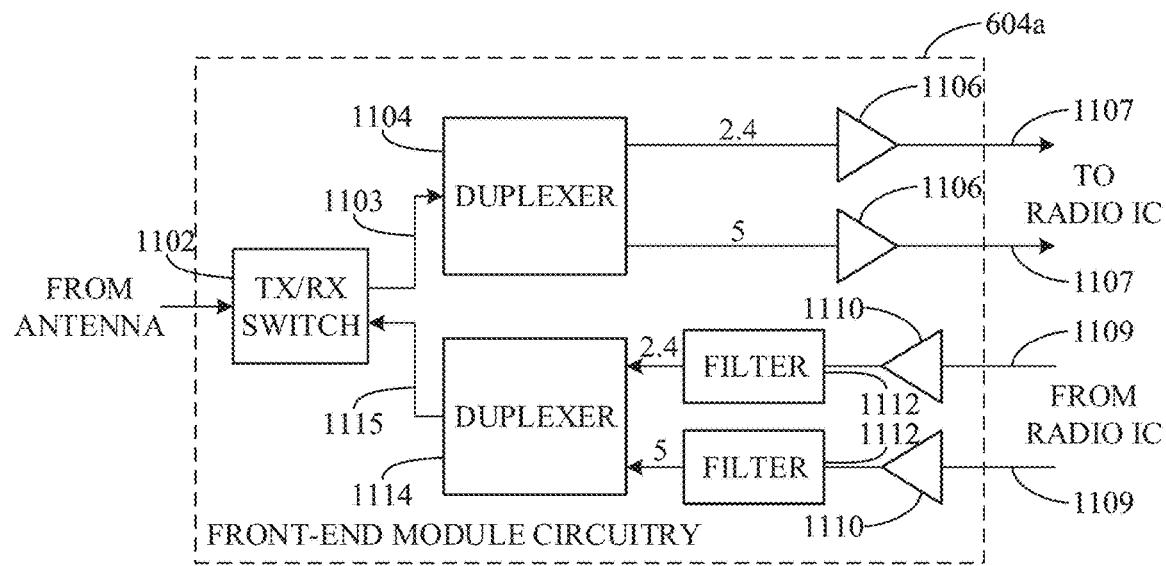
FIG. 11 illustrates an example front-end module circuitry for use in the radio architecture of FIG. 10 in accordance with some examples.

FIG. 11 illustrates WLAN FEM circuitry 1004a in accordance with some embodiments. Although the example of FIG. 11 is described in conjunction with the WLAN FEM circuitry 1004a, the example of FIG. 11 may be described in conjunction with the example BT FEM circuitry 1004b (FIG. 10), although other circuitry configurations may also be suitable.

In some embodiments, the FEM circuitry 1004a may include a TX/RX switch 1102 to switch between transmit mode and receive mode operation. The FEM circuitry 1004a may include a receive signal path and a transmit signal path. The receive signal path of the FEM circuitry 1004a may include a low-noise amplifier (LNA) 1106 to amplify received RF signals 1103 and provide the amplified received RF signals 1107 as an output (e.g., to the radio IC circuitry 1006a-b (FIG. 10)). The transmit signal path of the circuitry 1004a may include a power amplifier (PA) to amplify input RF signals 1109 (e.g., provided by the radio IC circuitry 1006a-b), and one or more filters 1112, such as band-pass filters (BPFs), low-pass filters (LPFs) or other types of filters, to generate RF signals 1115 for subsequent transmission (e.g., by one or more of the antennas 1001 (FIG. 10)) via an example duplexer 1114.

In some dual-mode embodiments for Wi-Fi communication, the FEM circuitry 1004a may be configured to operate in either the 2.4 GHz frequency spectrum or the 12 GHz frequency spectrum. In these embodiments, the receive signal path of the FEM circuitry 1004a may include a receive signal path duplexer 1104 to separate the signals from each spectrum as well as provide a separate LNA 1106 for each spectrum as shown. In these embodiments, the transmit signal path of the FEM circuitry 1004a may also include a power amplifier 1110 and a filter 1112, such as a BPF, a LPF or another type of filter for each frequency spectrum and a transmit signal path duplexer 1104 to provide the signals of one of the different spectrums onto a single transmit path for subsequent transmission by the one or more of the antennas 1001 (FIG. 10). In some embodiments, BT communications may utilize the 2.4 GHz signal paths and may utilize the same FEM circuitry 1004*a* as the one used for WLAN communications.

Figure 12:
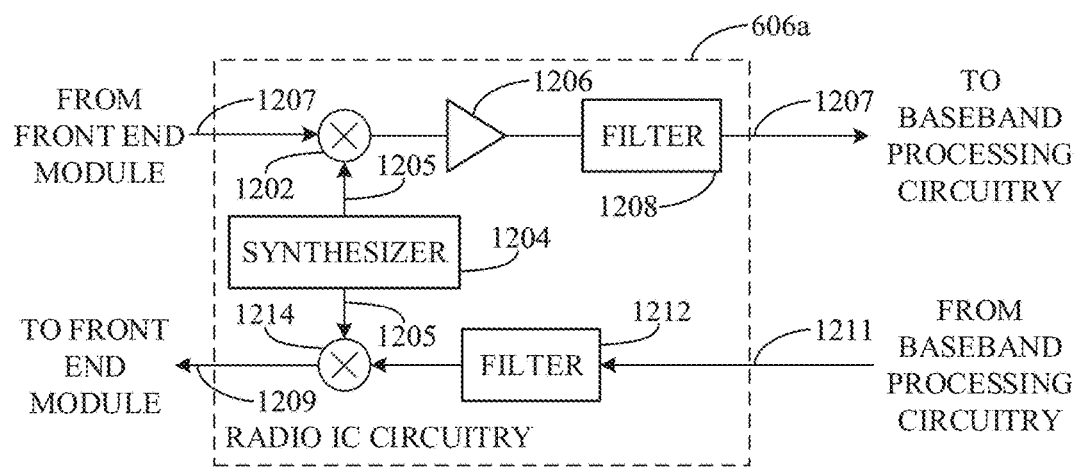
FIG. 12 illustrates an example radio IC circuitry for use in the radio architecture of FIG. 10 in accordance with some examples.

FIG. 12 illustrates radio IC circuitry 1006*a* in accordance with some embodiments. The radio IC circuitry 1006*a* is one example of circuitry that may be suitable for use as the WLAN or BT radio IC circuitry 1006*a*/1006*b* (FIG. 10), although other circuitry configurations may also be suitable. Alternatively, the example of FIG. 12 may be described in conjunction with the example BT radio IC circuitry 1006*b*.

In some embodiments, the radio IC circuitry 1006*a* may include a receive signal path and a transmit signal path. The receive signal path of the radio IC circuitry 1006*a* may include at least mixer circuitry 1202, such as, for example, down-conversion mixer circuitry, amplifier circuitry 1206 and filter circuitry 1208. The transmit signal path of the radio IC circuitry 1006*a* may include at least filter circuitry 1212 and mixer circuitry 1214, such as, for example, up-conversion mixer circuitry. Radio IC circuitry 1006*a* may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004*a*-*b* (FIG. 10) based on the synthesized frequency 1205 provided by synthesizer circuitry 1204. The amplifier circuitry 1206 may be configured to amplify the down-converted signals and the filter circuitry 1208 may include a LPF configured to remove unwanted signals from the down-converted signals to generate output baseband signals 1207. Output baseband signals 1207 may be provided to the baseband processing circuitry 1008*a*-*b* (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004*a*-*b*. The baseband signals 1211 may be provided by the baseband processing circuitry 1008*a*-*b* and may be filtered by filter circuitry 1212. The filter circuitry 1212 may include a LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuit 1204 may be provided by a voltage controlled oscillator (VCO), although that is not a requirement. A divider control input may further be provided by either the baseband processing circuitry 1008*a-b* (FIG. 10) or the link aggregator 104 (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the link aggregator 104. The application processor 106 may include, or otherwise be connected to, the example link aggregator 104.

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
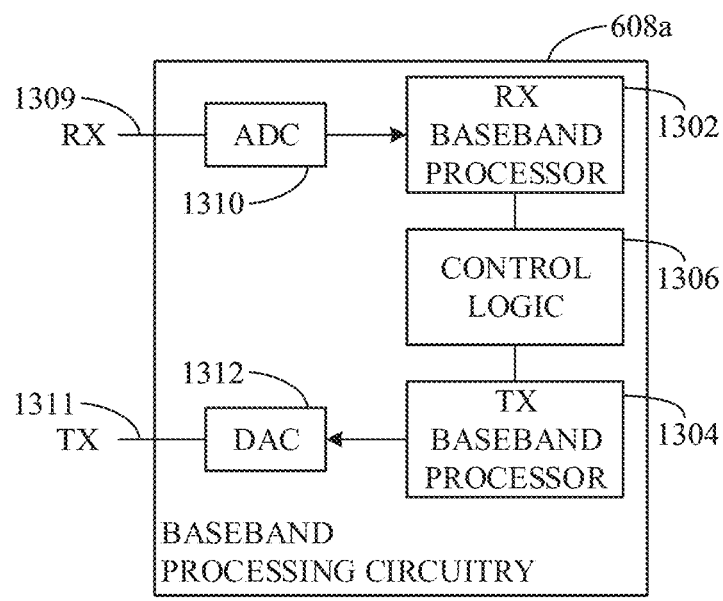
FIG. 13 illustrates an example baseband processing circuitry for use in the radio architecture of FIG. 10 in accordance with some examples.

FIG. 13 illustrates a functional block diagram of baseband processing circuitry 1008*a* in accordance with some embodiments. The baseband processing circuitry 1008*a* is one example of circuitry that may be suitable for use as the baseband processing circuitry 1008*a* (FIG. 10), although other circuitry configurations may also be suitable. Alternatively, the example of FIG. 123 may be used to implement the example BT baseband processing circuitry 1008*b* of FIG. 10.

The baseband processing circuitry 1008*a* may include a receive baseband processor (RX BBP) 1302 for processing receive baseband signals 1209 provided by the radio IC circuitry 1006*a-b* (FIG. 10) and a transmit baseband processor (TX BBP) 1304 for generating transmit baseband signals 1211 for the radio IC circuitry 1006*a-b*. The baseband processing circuitry 1008*a* may also include control logic 1306 for coordinating the operations of the baseband processing circuitry 1008*a*.

In some embodiments (e.g., when analog baseband signals are exchanged between the baseband processing circuitry 1008*a-b* and the radio IC circuitry 1006*a-b*), the baseband processing circuitry 1008*a* may include ADC 1310 to convert analog baseband signals 1309 received from the radio IC circuitry 1006*a-b* to digital baseband signals for processing by the RX BBP 1302. In these embodiments, the baseband processing circuitry 1008*a* may also include DAC 1312 to convert digital baseband signals from the TX BBP 1304 to analog baseband signals 1311.

In some embodiments that communicate OFDM signals or OFDMA signals, such as through baseband processor 1008*a*, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio-architecture 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 14:
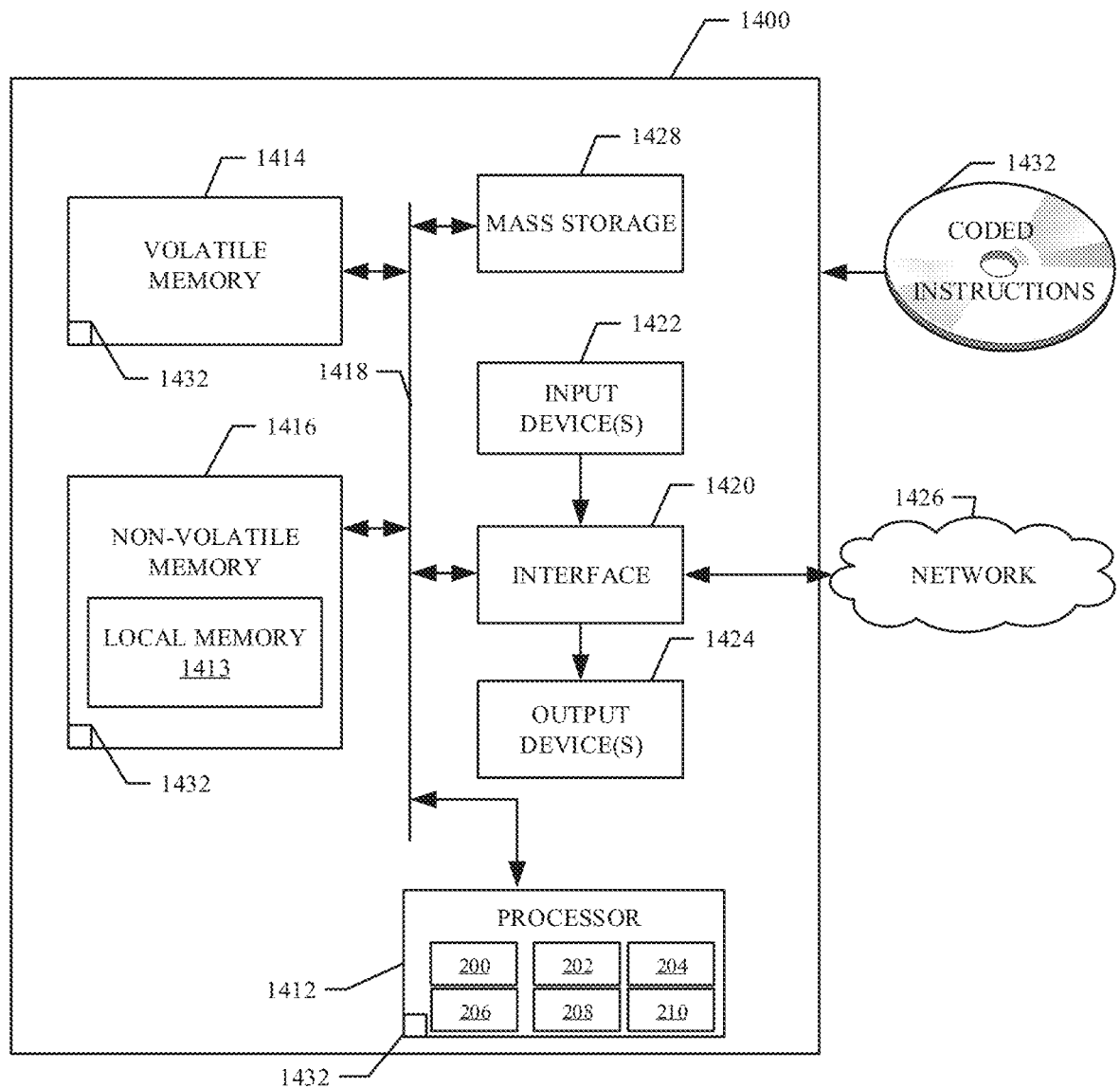
FIG. 14 is a block diagram of a processor platform structured to execute the example machine readable instructions of FIGS. 3-9 to implement the example link aggregator of FIGS. 1 and/or 2.

FIG. 14 is a block diagram of an example processor platform 1400 structured to execute the instructions of FIGS. 3-9 to implement the link aggregator 104 of FIG. 3. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the example receiver/transmitter 200, the example negotiation determiner 202, the example buffer controller 204, the example window determiner 206, the example BAR determiner 208, and/or the example buffer 210.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, a keyboard, a button, a mouse, a touchscreen, a track-pad, a trackball, and/or isopoint.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 3-9 may be stored in the mass storage device 1428, in the volatile memory 1414, in the non-volatile memory 1416, and/or on a removable non-transitory computer readable storage medium such as a CD or DVD.

Example 1 is an apparatus to perform multi-band link aggregation in a wireless network. Example 1 includes a buffer controller to store (a) a first set of data packets that have been received on a first interface and (b) a second set of data packets that have been received on a second interface into a buffer, the first and second sets of data packets being received from a wireless device, and a window determiner to control a first bitmap corresponding to the first set of data packets received on the first interface and a second bitmap corresponding to the second set of data packets received on the second interface, a first size of the first bitmap and a second size of the second bitmap being smaller than a third size of the buffer.

Example 2 includes the apparatus of example 1, further including a transmitter to, in response to the buffer controller storing the first and second sets of data packets in the buffer, transmit a first acknowledgement corresponding to the first bitmap using the first interface and a second acknowledgement corresponding to the second bitmap using the second interface.

Example 3 includes the apparatus of example 1, further including a negotiation determiner to negotiate link aggregation characteristics with the wireless device prior to receiving the first and second sets of data packets, the link aggregation characteristics corresponding to at least one of identities of the first and second interfaces, a first number of data packets corresponding to the first interface and a second number of data packets corresponding to the second interface, or the third size of the buffer.

Example 4 includes the apparatus of example 1, wherein the buffer controller is to store the first set of data packets and the second set of data packets in the buffer based on sequence numbers of the data packets.

Example 5 includes the apparatus of example 1, wherein the first and second sets of data packets are received from the wireless device during an overlapping time period.

Example 6 includes the apparatus of example 1, wherein the window determiner is to control the first bitmap by controlling a first scoreboard window based on data packets expected to be received using the first interface, control the second bitmap by controlling a second scoreboard window based on data packets expected to be received using the second interface, and control a buffer window corresponding to a mapping of data packet sequence numbers to registers of the buffer.

Example 7 includes the apparatus of example 6, wherein the window determiner is to update at least one of the first scoreboard window, the second scoreboard window, or the buffer window when a data packet corresponding to a sequence number outside of the buffer window is received on the first interface or the second interface.

Example 8 includes the apparatus of example 6, wherein the window determiner is to when a block acknowledgement request is received on the first interface, update at least one of the first scoreboard window, the second scoreboard window, or the buffer window based on data in the block acknowledgement request, and when the block acknowledgement request is received on the second interface, refrain from updating the first scoreboard window, the second scoreboard window, or the buffer window.

Example 9 includes the apparatus of example 6, wherein the window determiner is to when a block acknowledgement request includes a first bit value, update at least one of the first scoreboard window, the second scoreboard window, or the buffer window based on data in the block acknowledgement request, and when the block acknowledgement request includes a second bit value, refrain from updating the first scoreboard window, the second scoreboard window, or the buffer window.

Example 10 is a non-transitory computer readable storage medium comprising instructions which, when executed, cause a machine to at least store (a) a first set of data packets that have been received on a first interface and (b) a second set of data packets that have been received on a second interface into a buffer, the first and second sets of data packets being received from a wireless device, and update a first bitmap corresponding to the first set of data packets received on the first interface and a second bitmap corresponding to the second set of data packets received on the second interface, a first size of the first bitmap and a second size of the second bitmap being smaller than a third size of the buffer.

Example 11 includes the computer readable storage medium of example 10, wherein the instructions cause the machine to, in response to storing the first and second sets of data packets in the buffer, transmit a first acknowledgement corresponding to the first bitmap on the first interface and a second acknowledgement corresponding to the second bitmap on the second interface.

Example 12 includes the computer readable storage medium of example 10, wherein the instructions cause the machine to determine link aggregation characteristics based on negotiations with the wireless device prior to receiving the first and second sets of data packets, the link aggregation characteristics corresponding to at least one of identities of the first and second interfaces, a first number of data packets corresponding to the first interface and a second number of data packets corresponding to the second interface, or the third size of the buffer.

Example 13 includes the computer readable storage medium of example 10, wherein the instructions cause the machine to store the first set of data packets and the second set of data packets in the buffer according to sequence numbers of the data packets.

Example 14 includes the computer readable storage medium of example 10, wherein the first and second sets of data packets are received from the wireless device during an overlapping time period.

Example 15 includes the computer readable storage medium of example 10, wherein the instructions cause the machine to update the first bitmap by updating a first scoreboard window to correspond to data packets expected to be received using the first interface, update the second bitmap by updating a second scoreboard window to correspond to data packets expected to be received using the second interface, and update a buffer window corresponding to a mapping of data packet sequence numbers to registers of the buffer.

Example 16 includes the computer readable storage medium of example 15, wherein the instructions cause the machine to update at least one of the first scoreboard window, the second scoreboard window, or the buffer window when a data packet corresponding to a sequence number outside of the buffer window is received on the first interface or the second interface.

Example 17 includes the computer readable storage medium of example 15, wherein the instructions cause the machine to when a block acknowledgement request is received on the first interface, update at least one of the first scoreboard window, the second scoreboard window, or the buffer window based on data in the block acknowledgement request, and when the block acknowledgement request is received on the second interface, refrain from updating the first scoreboard window, the second scoreboard window, or the buffer window.

Example 18 includes the computer readable storage medium of example 15, wherein the instructions cause the machine to when a block acknowledgement request includes a first bit value, update at least one of the first scoreboard window, the second scoreboard window, or the buffer window based on data in the block acknowledgement request, and when the block acknowledgement request includes a second bit value, refrain from updating the first scoreboard window, the second scoreboard window, or the buffer window.

Example 19 is a method to perform multi-band link aggregation in a wireless network. Example 19 includes storing (a) a first set of data packets that have been received on a first interface and (b) a second set of data packets that have been received on a second interface into a buffer, the first and second sets of data packets being received from a wireless device, and controlling a first bitmap corresponding to the first set of data packets received on the first interface and a second bitmap corresponding to the second set of data packets received on the second interface, a first size of the first bitmap and a second size of the second bitmap being smaller than a third size of the buffer.

Example 20 includes the method of example 19, further including, in response to storing the first and second sets of data packets in the buffer, transmitting a first acknowledgement corresponding to the first bitmap on the first interface and a second acknowledgement corresponding to the second bitmap on the second interface.

Example 21 includes the method of example 19, further including determining link aggregation characteristics based on negotiations with the wireless device prior to receiving the first and second sets of data packets, the link aggregation characteristics corresponding to at least one of identities of the first and second interfaces, a first number of data packets corresponding to the first interface and a second number of data packets corresponding to the second interface, or the third size of the buffer.

Example 22 includes the method of example 19, further including storing the first set of data packets and the second set of data packets in the buffer according to sequence numbers of the data packets.

Example 23 includes the method of example 19, wherein the first and second sets of data packets are received from the wireless device during an overlapping time period.

Example 24 includes the method of example 19, further including controlling the first bitmap by updating a first scoreboard window to correspond to data packets expected to be received using the first interface, controlling the second bitmap by updating a second scoreboard window to correspond to data packets expected to be received using the second interface, and controlling a buffer window corresponding to a mapping of data packet sequence numbers to registers of the buffer.

Example 25 includes the method of example 24, further including updating at least one of the first scoreboard window, the second scoreboard window, or the buffer window when a data packet corresponding to a sequence number outside of the buffer window is received on the first interface or the second interface.

From the foregoing, it would be appreciated that the above disclosed method, apparatus, and articles of manufacture to perform multi-band link aggregation in a wireless network. Examples disclosed herein include protocols between two devices to be able to transmit data packets on different interfaces (e.g., frequency channels and/or bands). In some examples disclosed herein, the two devices are able to transmit data packets on different interfaces during an overlapping time period. Examples disclosed herein include sending different data packets on different interfaces and/or sending the same data packets on different interfaces, thereby increasing the throughput and/or decreasing the probability of packet loss in a manner that is scalable to a large number of interfaces.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to perform multi-band link aggregation in a wireless network, the apparatus comprising:
a buffer controller to store (A) a first set of data packets that have been received on a first interface and (B) a second set of data packets that have been received on a second interface into a buffer, the first and second sets of data packets being received from a wireless device; and
a window determiner to control a first bitmap corresponding to the first set of data packets received on the first interface and a second bitmap corresponding to the second set of data packets received on the second interface, a first size of the first bitmap and a second size of the second bitmap being smaller than a third size of the buffer.

2. The apparatus of claim 1, further including a transmitter to, in response to the buffer controller storing the first and second sets of data packets in the buffer, transmit a first acknowledgement corresponding to the first bitmap using the first interface and a second acknowledgement corresponding to the second bitmap using the second interface.

3. The apparatus of claim 1, further including a negotiation determiner to negotiate link aggregation characteristics with the wireless device prior to receiving the first and second sets of data packets, the link aggregation characteristics corresponding to at least one of identities of the first and second interfaces, a first number of data packets corresponding to the first interface and a second number of data packets corresponding to the second interface, or the third size of the buffer.

4. The apparatus of claim 1, wherein the buffer controller is to store the first set of data packets and the second set of data packets in the buffer based on sequence numbers of the data packets.

5. The apparatus of claim 1, wherein the first and second sets of data packets are received from the wireless device during an overlapping time period.

6. The apparatus of claim 1, wherein the window determiner is to:
control the first bitmap by controlling a first scoreboard window based on data packets expected to be received using the first interface;
control the second bitmap by controlling a second scoreboard window based on data packets expected to be received using the second interface; and
control a buffer window corresponding to a mapping of data packet sequence numbers to registers of the buffer.

7. The apparatus of claim 6, wherein the window determiner is to update at least one of the first scoreboard window, the second scoreboard window, or the buffer window when a data packet corresponding to a sequence number outside of the buffer window is received on the first interface or the second interface.

8. The apparatus of claim 6, wherein the window determiner is to:
when a block acknowledgement request is received on the first interface, update at least one of the first scoreboard window, the second scoreboard window, or the buffer window based on data in the block acknowledgement request; and
when the block acknowledgement request eceived on the second interface, refrain from updating the first scoreboard window, the second scoreboard window, or the buffer window.

9. The apparatus of claim 6, wherein the window determiner is to:
when a block acknowledgement request includes a first bit value, update at least one of the first scoreboard window, the second scoreboard window, or the buffer window based on data in the block acknowledgement request; and
when the block acknowledgement request includes a second bit value, refrain from updating the first scoreboard window, the second scoreboard window, or the buffer window.

10. A non-transitory computer readable storage medium comprising instructions which, when executed, cause a machine to at least:
store (A) a first set of data packets that have been received on a first interface and (B) a second set of data packets that have been received on a second interface into a buffer, the first and second sets of data packets being received from a wireless device; and.
update a first bitmap corresponding to the first set of data packets received on the first interface and a second bitmap corresponding to the second set of data packets received on the second interface, a first size of the first bitmap and a second size of the second bitmap being smaller than a third size of the buffer.

11. The computer readable storage medium of claim 10, wherein the instructions cause the machine to, in response to storing the first and second sets of data packets in the buffer, transmit a first acknowledgement corresponding to the first bitmap on the first interface and a second acknowledgement corresponding to the second bitmap on the second interface.

12. The computer readable storage medium of claim 10, wherein the instructions cause the machine to determine link aggregation characteristics based on negotiations with the wireless device prior to receiving the first and second sets of data packets, the link aggregation characteristics corresponding to at least one of identities of the first and second interfaces, a first number of data packets corresponding to the first interface and a second number of data packets corresponding to the second interface, or the third size of the buffer.

13. The computer readable storage medium of claim 10, wherein the instructions cause the machine to store the first set of data packets and the second set of data packets in the buffer according to sequence numbers of the data packets.

14. The computer readable storage medium of claim 10, wherein the first and second sets of data packets are received from the wireless device during an overlapping time period.

15. The computer readable storage medium of claim 10, wherein the instructions cause the machine to:
update the first bitmap by updating a first scoreboard window to correspond to data packets expected to be received using the first interface;
update the second bitmap by updating a second scoreboard window to correspond to data packets expected to be received using the second interface; and
update a buffer window corresponding to a mapping of data packet sequence numbers to registers of the buffer.

16. The computer readable storage medium of claim 15, wherein the instructions cause the machine to update at least one of the first scoreboard window, the second scoreboard window, or the buffer window when a data packet corresponding to a sequence number outside of the buffer window is received on the first interface or the second interface.

17. The computer readable storage medium of claim 15, wherein the instructions cause the machine to:
when a block acknowledgement request is received on the first interface, update at least one of the first scoreboard window, the second scoreboard window, or the buffer window based on data in the block acknowledgement request; and
when the block acknowledgement request is received on the second interface, refrain from updating the first scoreboard window, the second scoreboard window, or the buffer window.

18. The computer readable storage medium of claim 15, wherein the instructions cause the machine to:
- when a block acknowledgement request includes a first bit value, update at least one of the first scoreboard window, the second scoreboard window, or the buffer window based on data in the block acknowledgement request; and
- when the block acknowledgement request includes a second bit value, refrain from updating the first scoreboard window, the second scoreboard window, or the buffer window.

19. A method to perform multi-band link aggregation in a wireless network, the method comprising:
- storing, by executing an instruction using a processor, (A) a first set of data packets that have been received on a first interface and (B) a second set of data packets that have been received on a second interface into a buffer, the first and second sets of data packets being received from a wireless device; and
- controlling, by executing an instruction using the processor, a first bitmap corresponding to the first set of data packets received on the first interface and a second bitmap corresponding to the second set of data packets received on he second interface, a first size of the first bitmap and a second size of the second bitmap being smaller than a third size of the buffer.

20. The method of claim 19, further including, in response to storing the first and second sets of data packets in the buffer, transmitting a first acknowledgement corresponding to the first bitmap on the first interface and a second acknowledgement corresponding to the second bitmap on the second interface.

* * * * *

UNITED STATES PATENT AND TRADEMARK OFFICE
CERTIFICATE OF CORRECTION

| | |
|---|---|
| PATENT NO. | : 11,197,193 B2 |
| APPLICATION NO. | : 16/954473 |
| DATED | : December 7, 2021 |
| INVENTOR(S) | : Huang et al. |

It is certified that error appears in the above-identified patent and that said Letters Patent is hereby corrected as shown below:

In the Claims

In Claim 8, Line 52, delete "request eceived" and insert -- request is received --.

Signed and Sealed this
Twenty-ninth Day of August, 2023

*Katherine Kelly Vidal*

Katherine Kelly Vidal
*Director of the United States Patent and Trademark Office*